US011924515B2

(12) United States Patent
Lee et al.

(10) Patent No.: US 11,924,515 B2
(45) Date of Patent: Mar. 5, 2024

(54) DISPLAY DEVICE AND OPERATION METHOD THEREFOR

(71) Applicant: LG ELECTRONICS INC., Seoul (KR)

(72) Inventors: Hyeseung Lee, Seoul (KR); Eunyoung Cho, Seoul (KR); Miyeon Kwon, Seoul (KR); Obong An, Seoul (KR); Seongwoon Seol, Seoul (KR); Kyungryun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/429,537

(22) PCT Filed: Feb. 14, 2019

(86) PCT No.: PCT/KR2019/001851
§ 371 (c)(1),
(2) Date: Aug. 9, 2021

(87) PCT Pub. No.: WO2020/166742
PCT Pub. Date: Aug. 20, 2020

(65) Prior Publication Data
US 2022/0141537 A1 May 5, 2022

(51) Int. Cl.
*H04N 21/478* (2011.01)
*H04N 21/4722* (2011.01)
(Continued)

(52) U.S. Cl.
CPC ... *H04N 21/47815* (2013.01); *H04N 21/4722* (2013.01); *H04N 21/4828* (2013.01); *H04N 21/6581* (2013.01)

(58) Field of Classification Search
CPC .......... H04N 21/47815; H04N 21/812; H04N 21/8586; H04N 21/4722; H04N 21/858
See application file for complete search history.

(56) References Cited

U.S. PATENT DOCUMENTS 9,247,314 B1 * 1/2016 Parambath ......... H04N 21/2542
2001/0052133 A1 * 12/2001 Pack .................. H04N 21/8352
348/E7.071
(Continued)

FOREIGN PATENT DOCUMENTS

JP 2013-529325 A 7/2013
KR 10-2014-0059417 A 5/2014
(Continued)

OTHER PUBLICATIONS

International Search Report for PCT/KR2019/001851 dated Nov. 13, 2019.

*Primary Examiner* — Jason Salce
(74) *Attorney, Agent, or Firm* — Birch, Stewart, Kolasch & Birch, LLP

(57) ABSTRACT

The present disclosure provides a display device for providing a function of searching for a product, a person, a place, or music appearing in a video, and an operation method therefor. The display device includes a display configured to display video, a user input interface configured to receive a search command, a controller configured to obtain video scene information at a time point when the search command is received, and a network interface configured to receive information about a product included in the video scene at a time point when the search command is received, based on the video scene information, wherein the display is configured to display a search result screen including a product icon representing the product.

13 Claims, 20 Drawing Sheets

(51) Int. Cl.
*H04N 21/482* (2011.01)
*H04N 21/658* (2011.01)

(56) References Cited

U.S. PATENT DOCUMENTS

| | | | | |
|---|---|---|---|---|
| 2002/0013950 | A1* | 1/2002 | Tomsen | H04N 21/254 725/51 |
| 2003/0131357 | A1 | 7/2003 | Kim | |
| 2006/0015912 | A1* | 1/2006 | Itabashi | G01C 21/32 725/74 |
| 2008/0089551 | A1* | 4/2008 | Heather | H04N 21/235 375/E7.018 |
| 2009/0034784 | A1* | 2/2009 | McQuaide, Jr. | G06F 16/7343 382/100 |
| 2009/0210790 | A1* | 8/2009 | Thomas | H04N 21/8545 715/719 |
| 2009/0317050 | A1* | 12/2009 | Son | H04N 7/173 707/999.003 |
| 2011/0167456 | A1 | 7/2011 | Kokenos et al. | |
| 2011/0247042 | A1 | 10/2011 | Mallinson | |
| 2011/0306368 | A1* | 12/2011 | McCarthy | H04N 21/47815 709/217 |
| 2012/0066619 | A1* | 3/2012 | Lee | H04N 21/41265 715/760 |
| 2012/0117620 | A1* | 5/2012 | Cassidy | H04N 21/2543 726/3 |
| 2012/0296739 | A1* | 11/2012 | Cassidy | G06Q 30/0277 705/14.51 |
| 2013/0014155 | A1* | 1/2013 | Clarke | G11B 27/105 725/32 |
| 2013/0191745 | A1* | 7/2013 | Vella | H04N 5/445 715/716 |
| 2013/0205336 | A1* | 8/2013 | Ballai | H04N 21/234 725/32 |
| 2014/0032361 | A1 | 1/2014 | Gudorf et al. | |
| 2014/0082655 | A1* | 3/2014 | Moon | H04N 21/4722 725/27 |
| 2014/0255003 | A1 | 9/2014 | Abramson | |
| 2015/0106856 | A1* | 4/2015 | Rankine | H04N 21/8456 725/60 |
| 2015/0172777 | A1* | 6/2015 | Park | H04N 21/4668 725/43 |
| 2015/0208131 | A1* | 7/2015 | Chatter | H04N 21/8133 725/60 |
| 2015/0319506 | A1* | 11/2015 | Kansara | H04N 21/8547 725/32 |
| 2018/0357317 | A1* | 12/2018 | Santiago | H04N 21/4828 |
| 2019/0236682 | A1* | 8/2019 | Patel | G06Q 30/0623 |
| 2020/0134320 | A1 | 4/2020 | Crossley et al. | |

FOREIGN PATENT DOCUMENTS

| | | |
|---|---|---|
| KR | 10-2016-0069194 A | 6/2016 |
| WO | WO 2018/094201 A1 | 5/2018 |

* cited by examiner

DISPLAY DEVICE AND OPERATION METHOD THEREFOR

CROSS REFERENCE TO RELATED APPLICATION

This application is the National Stage filing under 35 U.S.C. § 371 of International Application No. PCT/KR2019/001851, filed on Feb. 14, 2019, which is hereby expressly incorporated by reference into the present application.

TECHNICAL FIELD

The present disclosure relates to a display device and an operation method therefor, and more particularly, to a display device for providing a search function while a user is watching content, and an operation method therefor.

BACKGROUND

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

On the other hand, a user may want to search for a product, a person, a place, or music appearing in a video while watching the video, and a user may use an Internet application in a display device or may search through a user's PC, smartphone, etc.

However, in this case, there is a problem in that the user cannot properly watch the video he or she is watching while searching, or it is difficult to find the same thing that appears in the video. Therefore, the user may need a function to more accurately and easily search for a product, a person, a place, or music appearing in a video while watching the video.

SUMMARY

Embodiments of the present disclosure provide a display device for providing a function of searching for a product, a person, a place, or music appearing in a video, and an operation method therefor.

A display device according to an embodiment of the present application a display configured to display video, a user input interface configured to receive a search command, a controller configured to obtain video scene information at a time point when the search command is received, and a network interface configured to receive information about a product included in the video scene at a time point when the search command is received, based on the video scene information, wherein the display is configured to display a search result screen including a product icon representing the product.

Wherein the controller is configured to further receive information about a person included in the video scene and display the product icon for each person.

Wherein the controller is configured to display a person icon representing each person appearing in the video scene based on the information about the person, and display a product icon related to a selected person when a select command for selecting the person icon is received.

Wherein the controller is configured to display a related product icon representing a product similar to the selected product when a select command for selecting the product icon is received.

Wherein the controller is configured to display a web icon for accessing a website for purchasing the selected product when a select command for selecting the product icon is received.

Wherein the controller is configured to display a mobile icon for transmitting a website address for purchasing a selected product to a mobile device when a select command for selecting the product icon is received, and transmit the website address to the mobile device when a select command for selecting the mobile icon is received.

Wherein the controller is configured to transmit the website address to the mobile device located within a set distance from the display through Bluetooth low energy (BLE).

Wherein the controller is configured to receive an input of a mobile phone number, and
transmit the website address to the inputted mobile phone number.

Wherein the controller is configured to display a shopping cart icon for adding a selected product to a shopping cart when a select command for selecting the product icon is received.

Wherein the controller is configured to display the product added to the shopping cart for each video when a display command for displaying a shopping cart screen is received.

Wherein the controller is configured to further receive information about music included in the video scene, and display information about the music on the search result screen.

wherein the controller is configured to display a music recognition icon on the search result screen, and when a select command for selecting the music recognition icon, recognize a sound through a microphone provided in a remote control device and display music information.

Wherein the controller is configured to further receive information about a place included in the video scene, and display information about the place on the search result screen.

Wherein the information about the place includes at least one of map information, address information, a business name, or a site for the place included in the video scene.

Wherein the search result screen includes a video area including the video and a search information area including the product icon.

Advantageous Effects

According to an embodiment of the present disclosure, there is an advantage in that information about a product appearing in a video can be more accurately and easily provided to a user.

In addition, since a product icon for each person appearing in a video is displayed, there is an advantage in that a user can more easily obtain information about the product by selecting a person of interest.

In addition, since products similar to those appearing in the video are displayed, there is an advantage in that it is possible to guide products related to the product of interest to the user and it is possible to guide other products in case the product of interest is out of stock.

In addition, there is an advantage in that a user can easily access a website for purchasing a product appearing in a video by using the Internet or a mobile device in a display device.

In addition, since products added to a shopping cart are displayed for each video, there is an advantage in that a user can easily find the products that have been added to the shopping cart in the past, based on the video.

In addition, since information about music included in a video scene is displayed or sound is recognized through a microphone, there is an advantage in that information about music coming from the video the user is watching can be guided to the user.

In addition, there is an advantage in that information about a place included in a video scene can be more accurately and easily provided to a user.

Furthermore, it is possible to display a video the user is watching and search information about a video scene at a time point when a search command is received. In this case, there is an advantage in that a user can easily obtain information about a person, a product, music, related video, a place, etc. in a video while watching the video.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
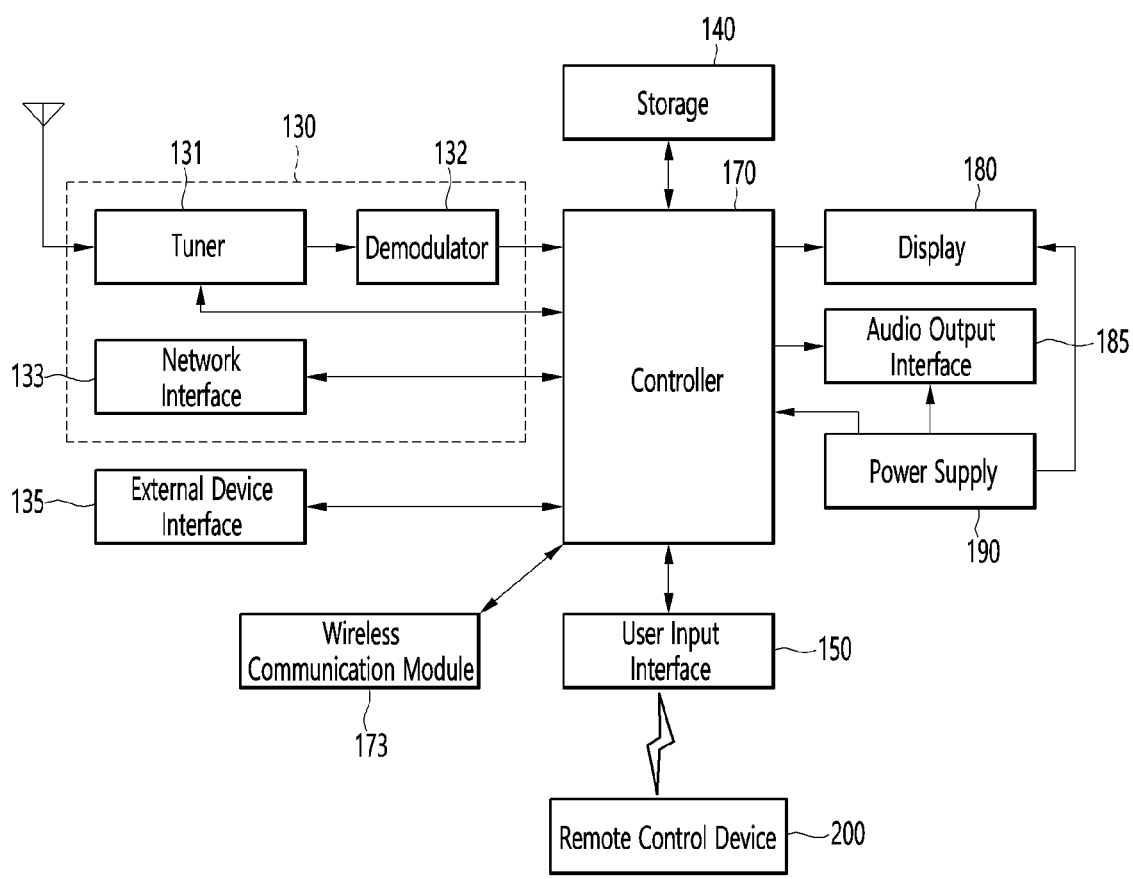
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

The network interface 133 can provide an interface for connecting the display device 100 to a wired/wireless network including internet network. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
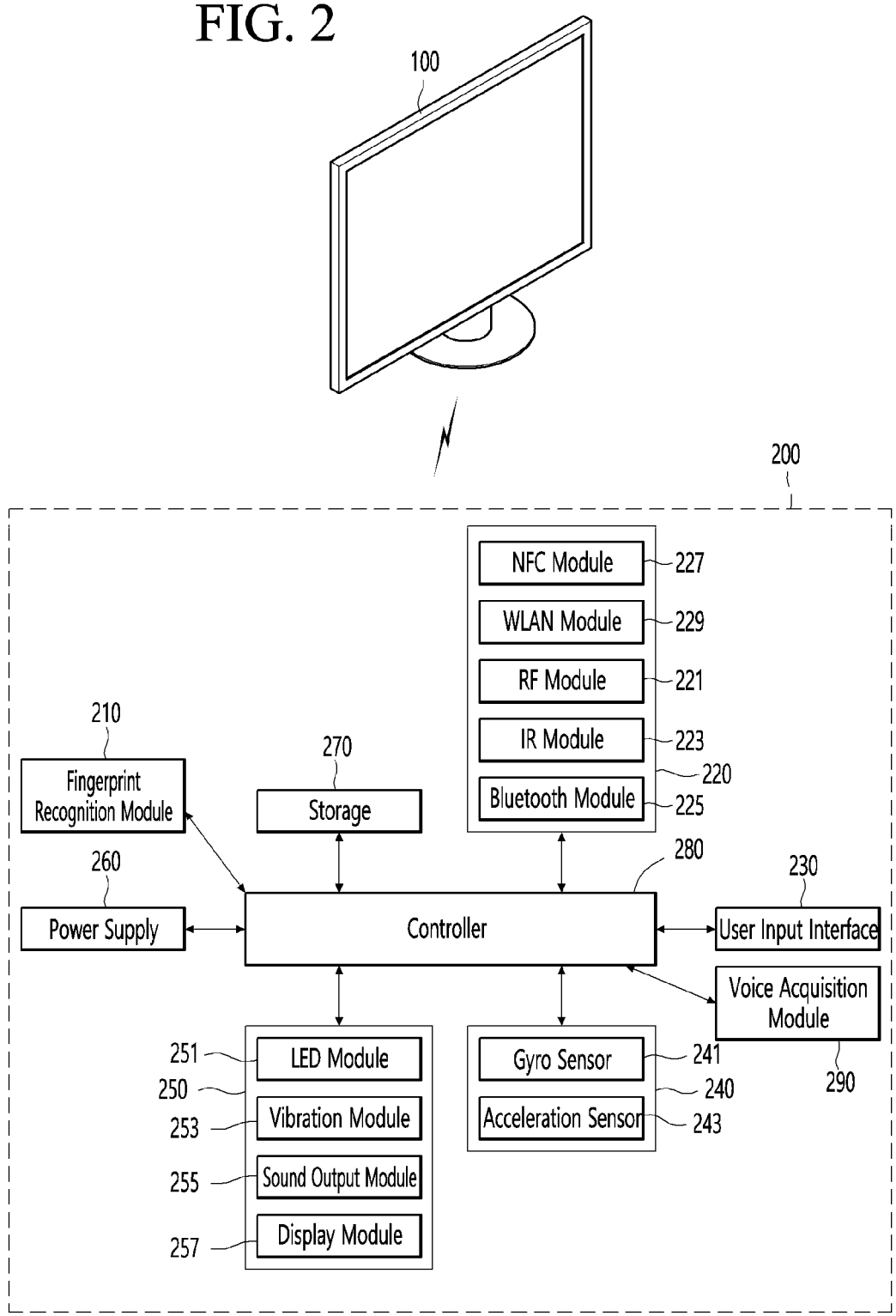
FIG. 2 is a block diagram illustrating a remote control device according to an embodiment of the present disclosure.
Figure 3:
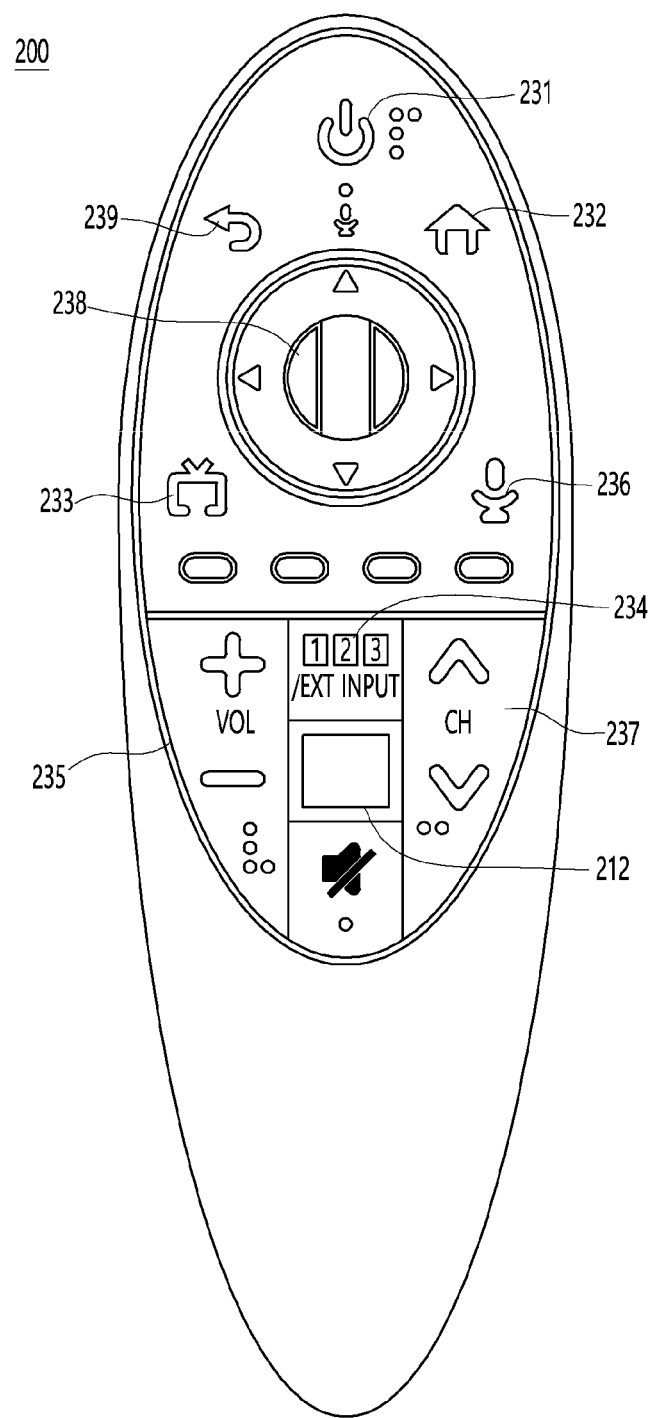
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
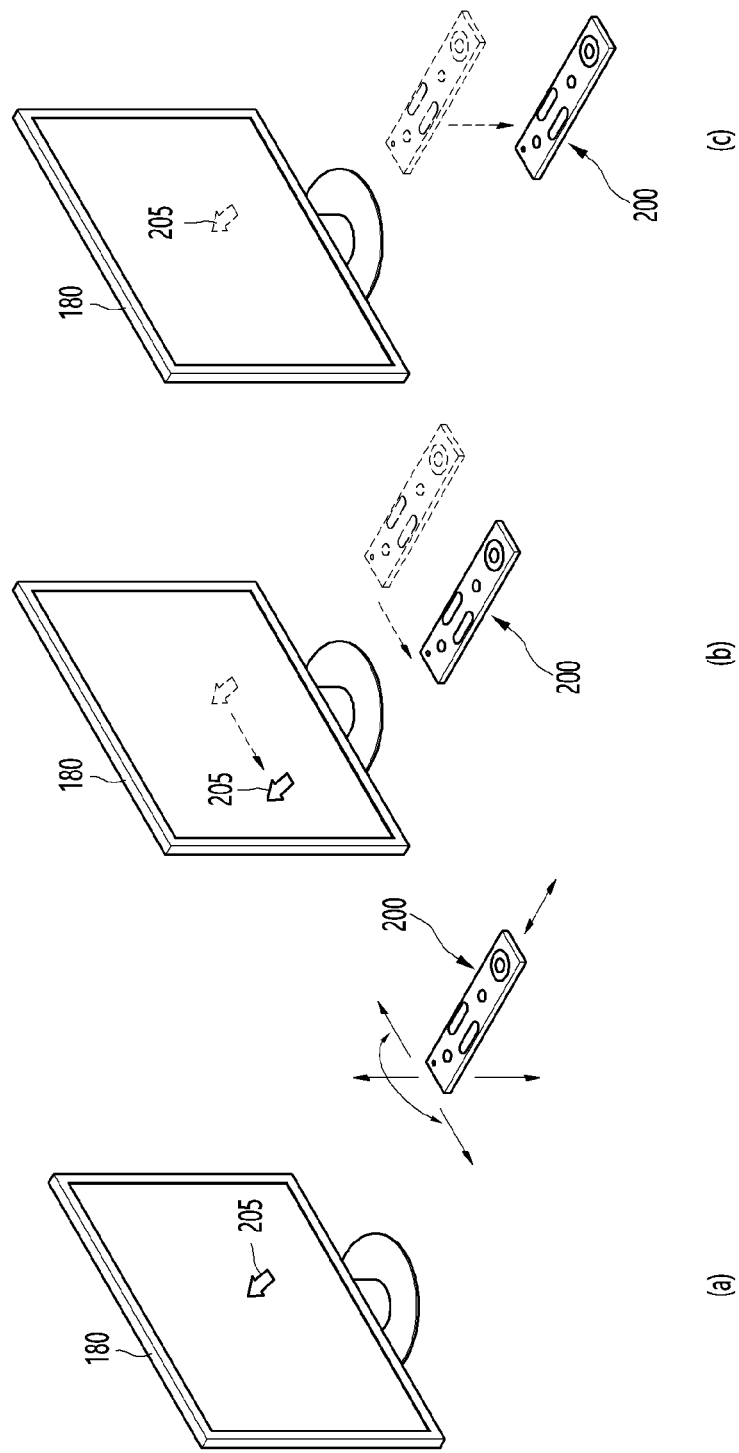
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
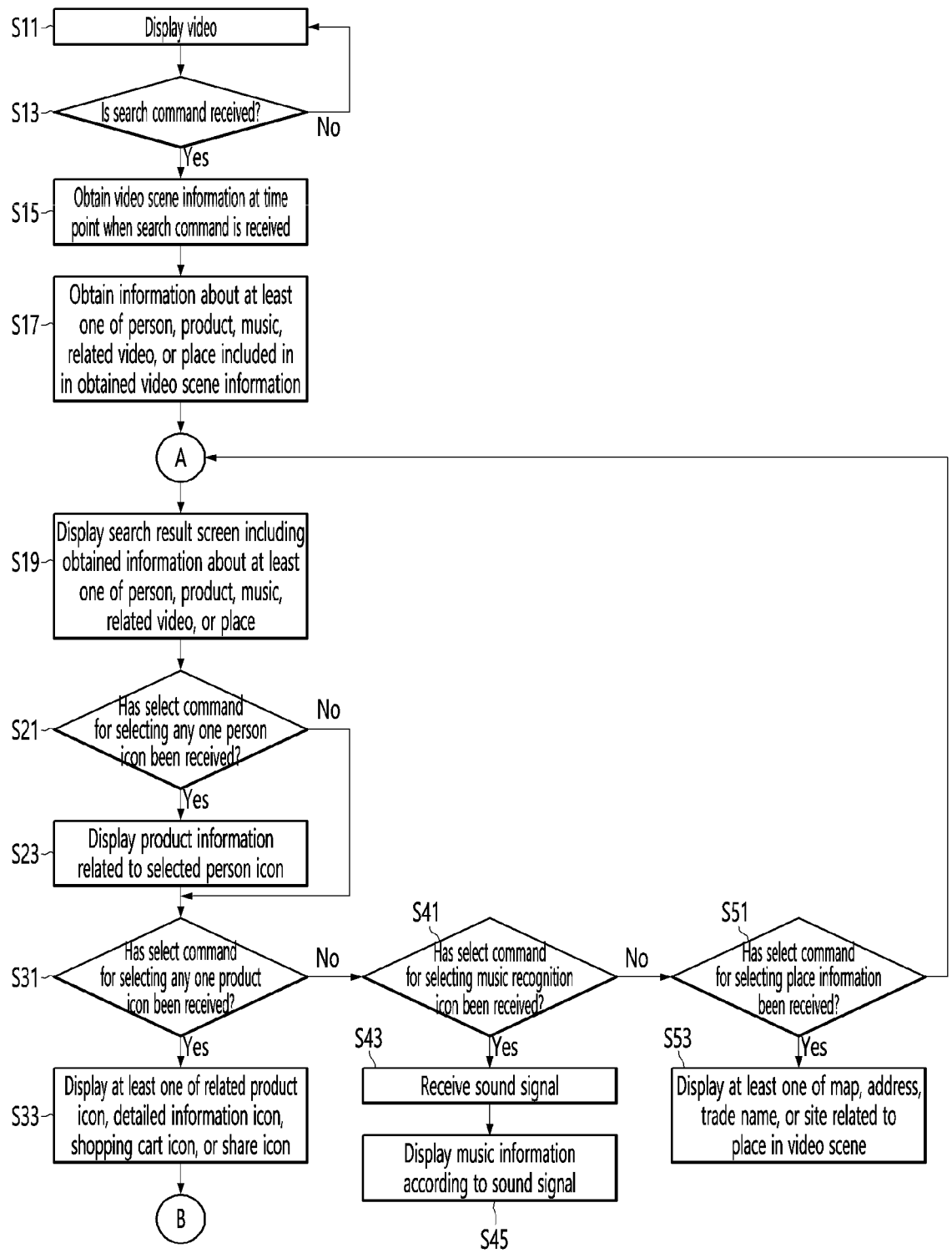
FIG. 5 is a flowchart illustrating an operation method of a display device according to an embodiment of the present disclosure.

FIG. 5 is a flowchart illustrating an operation method of a display device according to an embodiment of the present disclosure.

The display 180 may display video (S11).

The video may refer to content such as a drama, a movie, a documentary, a home shopping, etc. that is received and broadcasted through radio waves by the display device 100. For example, the video may include various contents such as a broadcast program, video on demand (VOD), a home shopping, and a game that are broadcasted in real time.

The controller 170 may determine whether a search command is received (S13).

The search command may be a command for executing a search for video currently being broadcasted.

The search command may be a command for executing a search for a video scene of the video being broadcasted at a time point when the search command is received.

The search command may be a command for executing a search for a person, a product, a place, or music appearing in the video being currently broadcasted.

According to an embodiment, the controller 170 may recognize, as a search command, a select command for selecting a search icon (see 701 of FIG. 7) displayed on the screen. In this case, when the select command for selecting the search icon 701 is received, the controller 170 may determine that the search command has been received.

Next, a method for receiving a search command through a search icon according to an embodiment of the present disclosure will be described with reference to FIG. 7.

Figure 7:
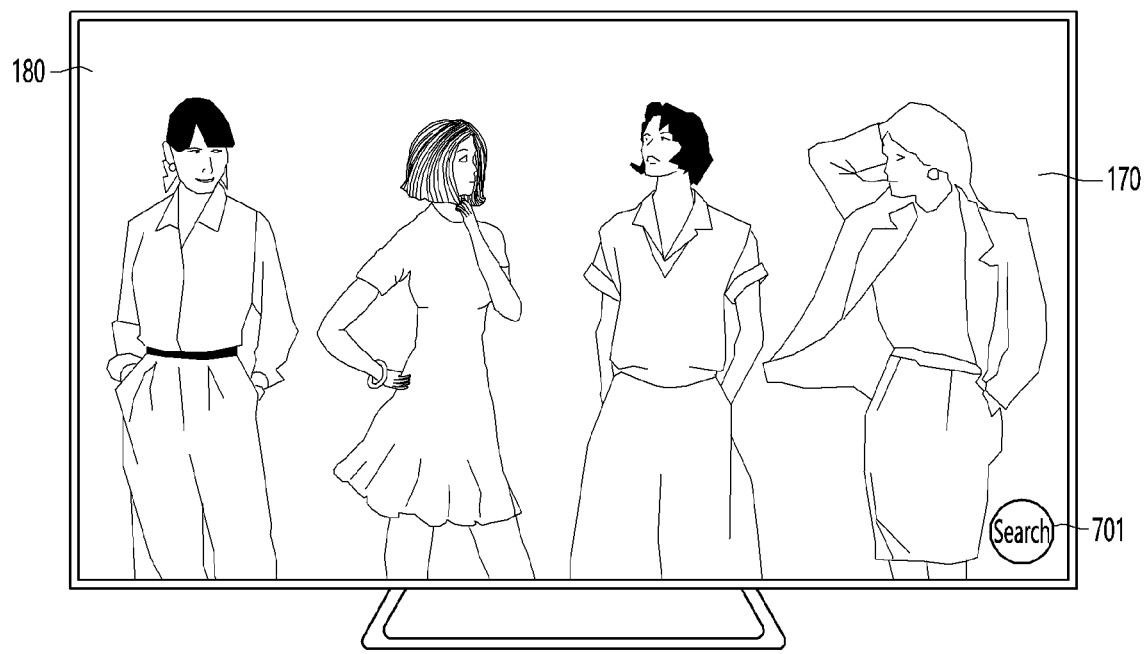
FIG. 7 is an exemplary view for explaining a search icon according to an embodiment of the present disclosure.

FIG. 7 is an exemplary view for explaining a search icon according to an embodiment of the present disclosure.

As illustrated in FIG. 7, the display 180 may display any one video 700, and the controller 170 may display the search icon 701 on the video 700.

The controller 170 may display the search icon 701 when the video 700 being displayed is a video capable of providing a search function.

When the select command for selecting the search icon 701 is received, the controller 170 may determine that the search command has been received.

According to another embodiment, the controller 170 may set a button for receiving a search command as at least one button provided in the remote control device 200. In this case, the controller 170 may recognize, as the search command, a command for selecting a button set in the remote control device 200. Therefore, when a command for selecting at least one preset button is received from the remote control device 200, the controller 170 may determine that the search command has been received.

When the user wants to search for the video while watching the video, he or she may select the search icon 701 on the screen or may select a setting button of the remote control device 200.

On the other hand, the controller 170 is not limited to the above-described embodiment, and may determine whether the search command is received in various ways.

The controller 170 may obtain video scene information at a time point when the search command is received (S15).

When the search command is received, the controller 170 may obtain video scene information at a time point when the search command is received.

The controller 170 may obtain video scene information at a time point when the search command is received by obtaining a content name and a content reproduction time point.

According to a first embodiment, the controller 170 may obtain video scene information by using an electronic program guide (EPG).

Specifically, when the search command is received, the controller 170 may obtain time information and channel information at a time point when the search command is received and may obtain, from the EPG, a content name and a content reproduction time point corresponding to the obtained time information and channel information. For example, when the time information at the time point when the search command is received is 2:30 and the channel information is CH 1, the controller 170 may obtain the content name corresponding to 2:30 of CH 1 from the EPG, and when the start time point of the content corresponding to 2:30 of CH 1 is 2 o'clock, the controller 170 may obtain 00:30:00 as the content reproduction time point.

In this case, the video may be video received through the broadcast reception module 130 or video received through the image processing device such as the set-top box.

According to a second embodiment, the controller 170 may obtain video scene information at a time point when a search command is received through a content provider.

Specifically, when the video is video received through the content provider, the controller 170 may receive the content name and the video reproduction time point information together when receiving the video, and may obtain the content reproduction time by obtaining the current reproduction time based on the content start time point.

According to a third embodiment, the controller 170 may obtain video scene information through capture.

Specifically, when the search command is received, the controller 170 may capture the current screen and transmit the captured screen image to an external server (not shown).

According to an embodiment, the controller 170 may generate a fingerprint of the screen image through an algorithm such as perceptual hashing (pHash), scale invariant feature transform (SIFT), and the like, and may transmit the generated fingerprint to an external server (not shown) as the captured screen image. In this way, when the controller 170 transmits the fingerprint to the external server in the fingerprint form, the screen image may be encrypted.

The external server (not shown) may receive a screen image from the display device 100. When the screen image is encrypted, the external server (not shown) may obtain the screen image by decrypting the encrypted screen image according to an encryption algorithm.

The external server (not shown) may obtain video scene information including a content name and a content reproduction time point through Automatic Contents Recognition (ACR), and transmit the obtained video scene information to the display device 100.

The ACR is an identification technology for automatically recognizing content, and may refer to a technology for obtaining video scene information by using a video fingerprint. For example, the external server (not shown) may obtain video scene information by comparing the fingerprint of the captured screen image with a fingerprint stored in a database.

On the other hand, according to an embodiment, when capturing the screen image and transmitting the captured screen image to the external server (not shown), the controller 170 may further transmit video scene information obtained through the EPG or the content provider. In this case, the video scene information can be obtained more accurately, and the time required for obtaining the video scene information can be minimized.

For example, the external server (not shown) may calculate search target content and a search target reproduction time (reproduction time including 5 minutes before and after the content reproduction time) based on the video scene information received together with the screen image, and may obtain video scene information by comparing the fingerprint according to the search target content and the search target reproduction time with the fingerprint according to the screen image. When the obtained video scene information is different from the received video scene information, the external server (not shown) may delete the received video scene information. In this case, there is an advantage in that the time required for obtaining video scene information can be minimized.

The controller 170 may obtain information about at least one of a person, a product, music, related video, or a place included in the obtained video scene information (S17).

The controller 170 may transmit the obtained video scene information to the external server (not shown), and may receive, from the external server (not shown), information about at least one of a person, a product, music, related video, or a place according to the video scene information.

Specifically, the external server (not shown) may store scene metadata for each video scene. The scene metadata may include information about at least one of a person, a product, music, related video, or a place included in the respective video scenes for each content. When the video scene information is received, the external server (not shown) may obtain scene metadata corresponding to the video scene information and transmit the scene metadata to the display device 100.

On the other hand, the controller 170 may directly obtain information about at least one of a person, a product, music, related video, or a place according to the obtained video scene information.

The controller 170 may display a search result screen including the obtained information about at least one of the person, the product, the music, the related video, or the place (S19).

The search result screen is a screen displayed in response to the search command, and may include information about at least one of a person, a product, music, related video, or a place included in the video scene at a time point when the search command is received.

Figure 8:
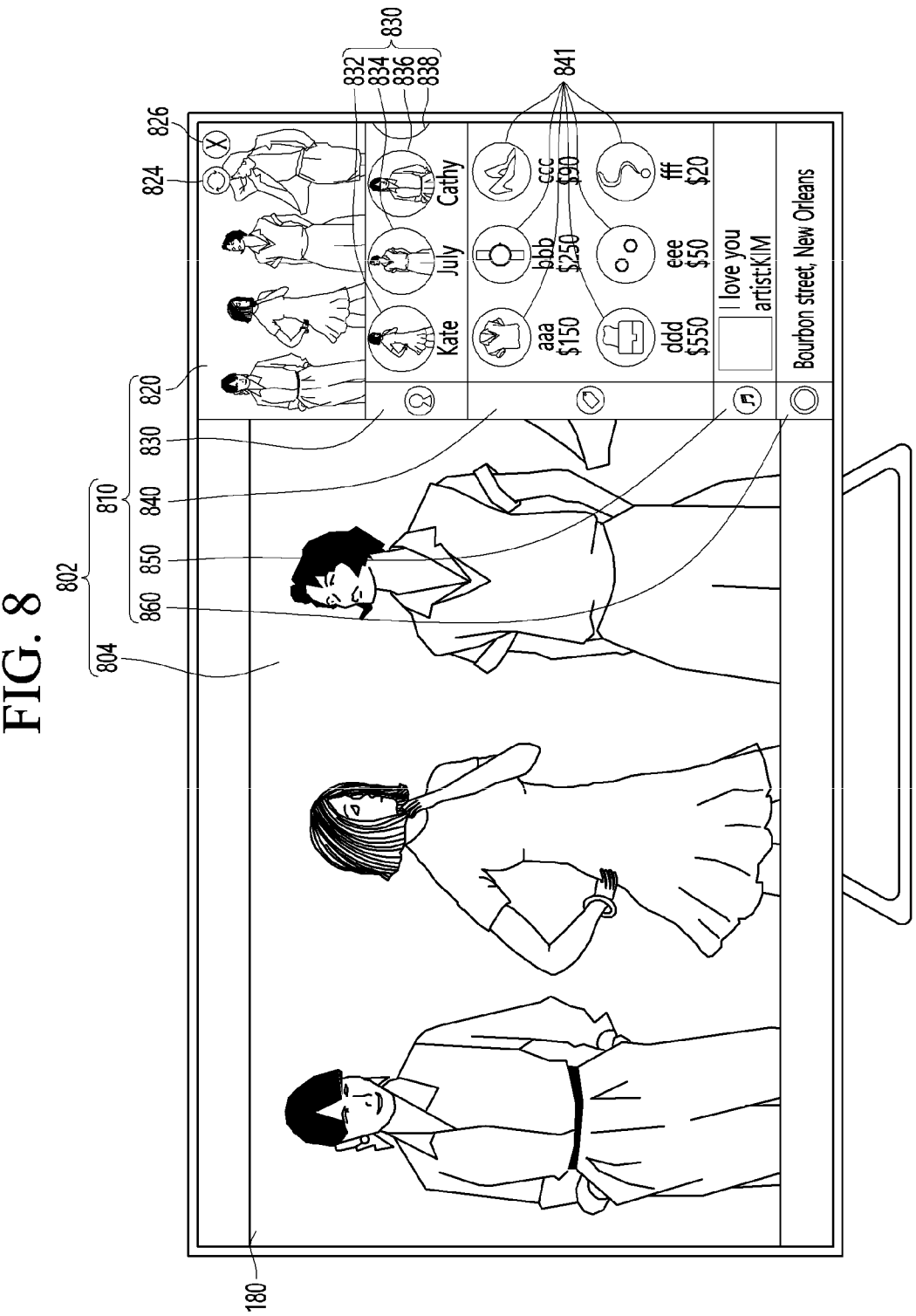
FIGS. 8 to 9 are exemplary views for explaining a method for displaying a search result screen according to various embodiments of the present disclosure.
Figure 9:
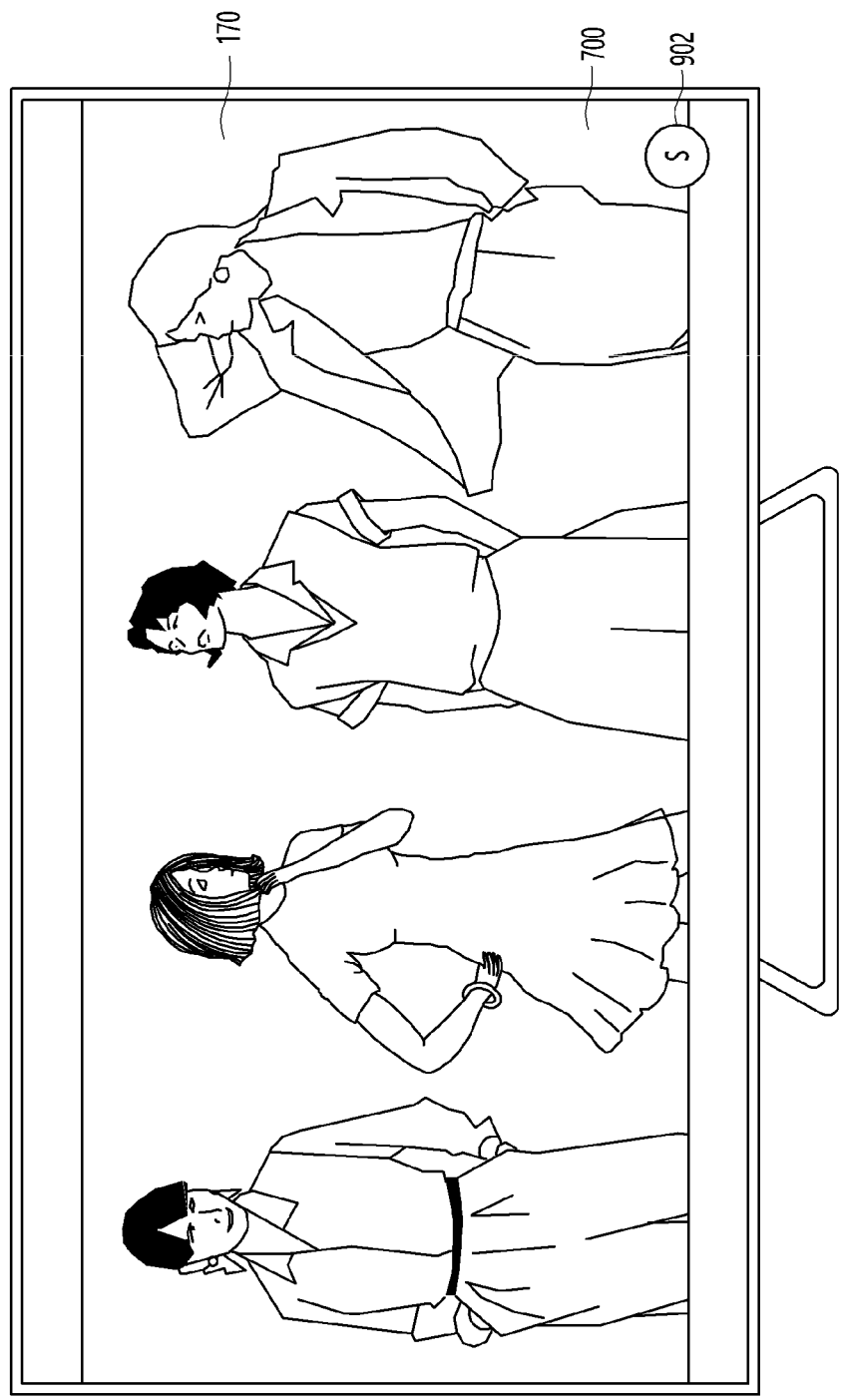

FIGS. 8 to 9 are exemplary views for explaining a method for displaying a search result screen according to various embodiments of the present disclosure.

According to the first embodiment of the present disclosure, when a search command is received, the controller 170 may directly display a search result screen 802 as shown in FIG. 8.

In this case, since the search result for the video scene requested by the user is immediately provided, there is an advantage that the search result can be provided more quickly. According to the second embodiment of the present disclosure, when a search command is received, a search result icon 902 may be displayed on a video 700 as shown in FIG. 9, and when a select command for selecting the search result icon 902 is received, a search result screen 802 may be displayed as shown in FIG. 8. That is, according to the second embodiment of the present disclosure, the controller 170 may display the search result icon 902 instead of directly displaying the search result screen 802 even when the search command is received.

In this case, by displaying only the search result icon for providing the search result screen, instead of immediately displaying the search result screen when the search command is received, there is an advantage in that it is possible to minimize the user's interruption with video viewing and to provide the search result screen only when the user requires it.

According to the second embodiment of the present disclosure, when the search command is received, the controller 170 does not immediately display the search result screen 802, and when an advertisement is displayed while the video is being displayed, the controller 170 may display the search result screen 802 while the advertisement is displayed. In this case, there is an advantage in that it is possible to minimize the user's interference with video viewing.

According to an embodiment, the controller 170 may remove the search result icon 902 when the video upon receiving the search command ends. Specifically, when the search command is received while first video is being displayed, the controller 170 may display the search result icon 902 only when the display 180 is displaying the first video, and when second video is displayed after the first video is ended, the controller 170 may not display the search result icon 902 for the first video.

On the other hand, when the controller 170 removes the search result icon 902 being displayed, the controller 170 may store the search result for the first video in the storage 140, and when the select command for selecting a search result list (not shown) is received, the controller 170 may display the search result for the first video again.

Next, the search result screen 802 will be described in detail with reference to FIG. 8.

The controller 170 may display the search result screen 802 in response to the search command.

The search result screen 802 may include a video area 804 and a search information area 810.

The video area 804 may be an area for continuously displaying the video the user is watching. The controller 170 may display, on the video area 804, the video 700 upon reception of the search command.

According to the first embodiment, the controller 170 may display the video 700 on the video area 804 without changing the size of the video 700 upon reception of the search command. In this case, a portion of the video 700 may be cut off and not displayed.

According to the second embodiment, the controller 170 may display the video 700 on the video area 804 without changing the size of the video 700 upon reception of the search command, and may display the search information area 810 semi-transparently. In this case, a portion of the video 700 may be displayed semi-transparently.

According to the third embodiment, the controller 170 may display the video 700 on the video area 804 in a state in which the size of the video 700 upon reception of the search command is reduced to be smaller than or equal to the size of the video area 804. In this case, since the video 700 is not cut, the user can watch the entire video 700 and check the search information area 810.

The search information area 810 may include at least one of a search target image 820, person information 830, product information 840, music information 850, or place information 860.

The search target image 820 may include a search target video scene. The user may check whether the search target video scene matches the video scene intended by the user through the search target image 820.

According to an embodiment, the controller 170 may further display a change icon 824 and an end icon 825. The controller 170 may display the update icon 824 and the end icon 825 on the search target image 820.

The change icon 824 may be an icon for changing the search target image 820. The search target video scene displayed on the search target image 820 may be different from the video scene intended by the user. In this case, the change icon 824 may provide a function for changing the search target video scene.

When the select command for selecting the change icon 824 is received, the controller 170 may change the video scene displayed on the search target image 820 to another scene. In this case, the other scene may be a video scene within 5 seconds before and after the video scene displayed on the search target image 820.

The end icon 825 may be an icon for ending the displaying of the search result screen 802. When the select command for selecting the end icon 825 is received, the controller 170 may end the search result screen 802 and display the video 700.

The person information 830 may include at least one person icon 830 representing a person in the search target video scene. In the example of FIG. 8, the person icon 830 may include a first person icon 832, a second person icon 834, a third person icon 836, and a fourth person icon 838.

Each of the first person icon 832, the second person icon 834, the third person icon 836, and the fourth person icon 838 may include a person's name. The person's name may be an actual actor's name or a character's name in the video.

On the other hand, the person information 830 is not limited to a person, and may include an animal icon (not shown) representing an animal such as a dog or a cat.

The product information 840 may include at least one product icon 841 representing a product in the search target video. The product icon 841 may include a product name and price information.

For example, the product information 840 may include information about products such as clothes, shoes, bags, watches, necklaces, earrings, and the like included in the search target video scene.

The music information 850 may include at least one of an album image, an album name, a song title, or an artist name for a sound in the search target video scene.

According to one embodiment, the music information 850 is stored as scene metadata. In this case, information about the sound in the video scene can be displayed immediately according to the search command. In this case, when a select command for selecting the music information 850 is received, the controller 170 may play the corresponding music with a music player in the display device 100 or may add the corresponding music to a playlist in the music player. According to an embodiment, when the select command for selecting the music information 850 is received, the controller 170 may transmit the corresponding music to a user's mobile phone.

According to another embodiment, the music information 850 may include a music recognition icon 851, and sound information may be provided by directly recognizing the sound in the video scene through the music recognition icon 851. This will be described later with reference to FIG. 19.

On the other hand, when the music information 850 is displayed, the controller 170 may further display an additional function icon for displaying music, video, and the like related to the corresponding music.

The place information 860 may include information about a place in the search target video scene. The information about the place may include at least one of an address, a business name, or a map. When the video being displayed upon reception of the search command is restaurant-related video, the place information 860 may include the information about the corresponding restaurant.

The place information 860 will be described with reference to FIG. 20.

On the other hand, the search information area 810 shown in FIG. 8 is only an example for convenience of description, and the controller 170 may display search information in various ways. In addition, the search information area 810 may further include related video information, content information, and the like.

The related video information is information about video similar to the search target video scene, and may be information about the same video as at least one of an appearance person, an appearance place, an appearance music, or an appearance product.

The content information may be information about video including the search target video scene.

Again, FIG. 5 is described.

The controller 170 may determine whether a select command for selecting any one person icon has been received (S21). When the select command for selecting any one person icon is received, the controller 170 may display product information related to the selected person icon (S23).

The controller 170 may determine whether a select command for selecting the person icon 830 has been received on the search result screen 802 as shown in FIG. 8.

When the select command for selecting any one person icon from the person information 830 is received, the controller 170 may display at least one product icon corresponding to the selected person icon on the product information 840.

For example, the controller 170 may display a product icon worn by a first person in the product information 840 when a select command for selecting a first person icon 832 is received, may display a product icon worn by a second person in the product information 840 when a select command for selecting a second person icon 834 is received, may display a product icon worn by a third person in the product information 840 when a select command for selecting a third person icon 836 is received, and may display a product icon worn by a fourth person in the product information 840 when a select command for selecting a fourth person icon 838 is received.

In this case, there is an advantage in that product information such as clothes or accessories worn by the people in the video scene can be checked for each person.

When the select command for selecting any one person icon is received or is not received, the controller 170 may determine whether the select command for selecting any one product icon 841 has been received (S33).

When the select command for selecting any one product icon 841 is received, the controller 170 may display at least one of a related product icon (see 950 of FIG. 10), a detailed information icon (see 920 of FIG. 10), a shopping cart icon (see 930 of FIG. 10), or a share icon (see 940 of FIG. 10) (S33).

Next, a method for providing product information when the controller 170 receives the select command for selecting any one product icon 841 will be described with reference to FIG. 6.

Figure 6:
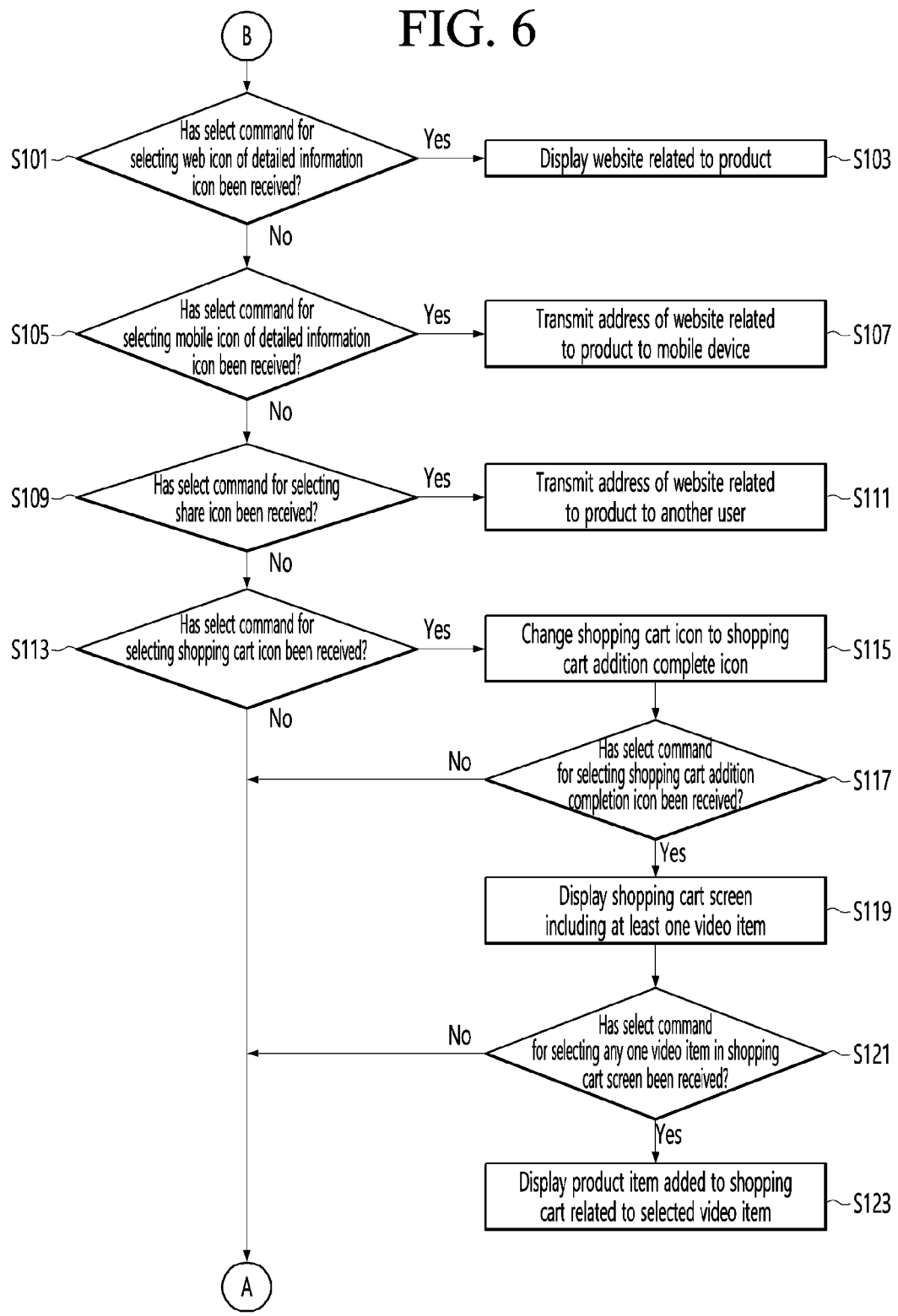
FIG. 6 is a flowchart illustrating a method, performed by a display device, for providing product information, according to an embodiment of the present disclosure.

FIG. 6 is a flowchart illustrating a method, performed by a display device, for providing product information, according to an embodiment of the present disclosure. In addition, FIG. 6 may be a flowchart following A and B of FIG. 5.

The controller 170 may determine whether the select command for selecting one of the related product icon 950, the detailed information icon 920, the shopping cart icon 930, and the share icon 940 has been received.

The related product icon 950, the detailed information icon 920, the shopping cart icon 930, and the share icon 940 will be described with reference to FIG. 10.

Figure 10:
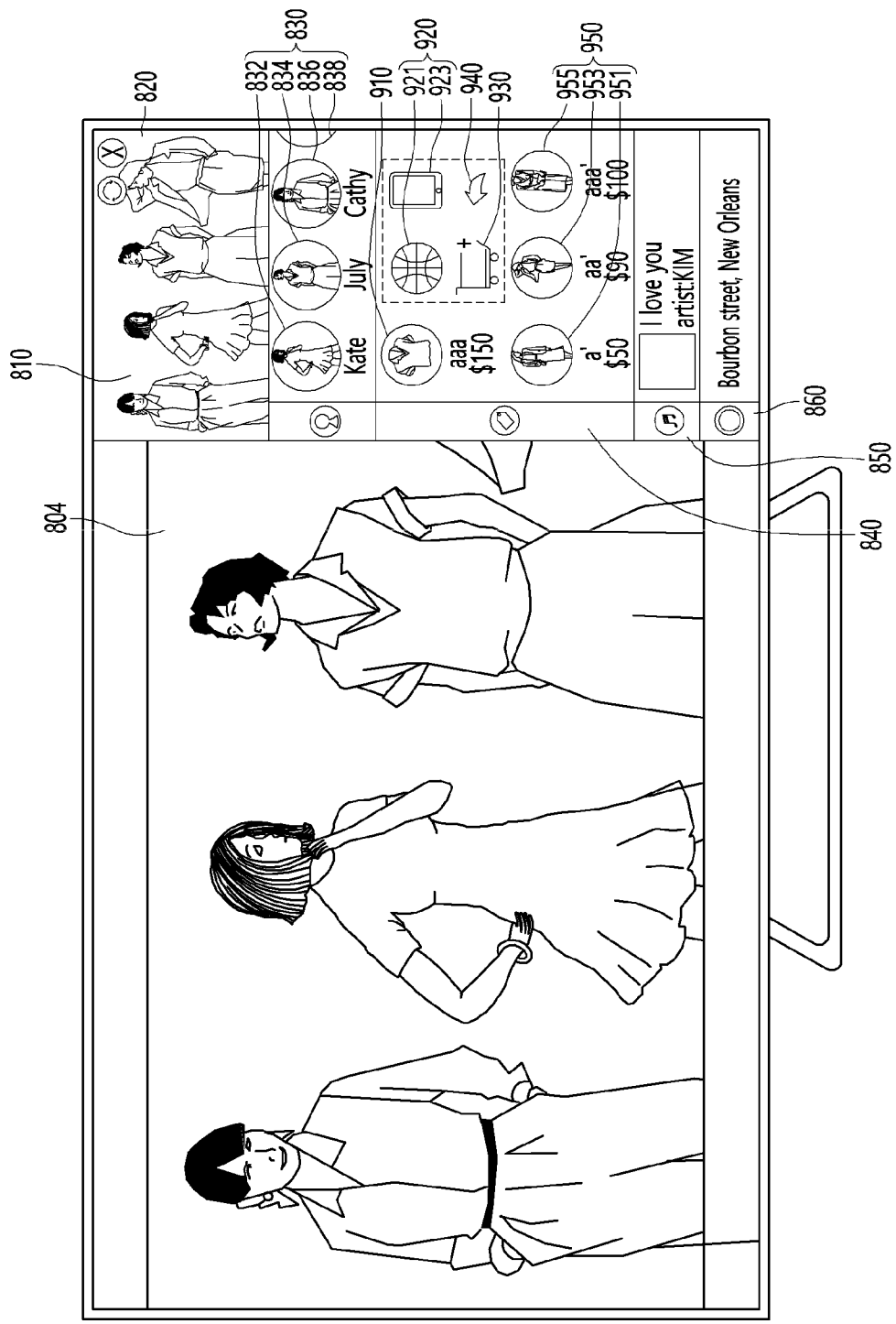
FIG. 10 is a view illustrating a method for displaying product information when a product icon is selected, according to an embodiment of the present disclosure.

FIG. 10 is a view illustrating a method for displaying product information when a product icon is selected, according to an embodiment of the present disclosure.

As shown in FIG. 10, when the select command for selecting any one product icon 841 is received, the controller 170 may display at least one of a selected product icon 910, a related product icon 950 for the selected product, a detailed information icon 920, a shopping cart icon 930, or a share icon 940.

The selected product icon 910 may be an icon representing a selected product among at least one product icon 841 displayed on the product information 840.

The related product icon 950 may be an icon related to a product corresponding to the selected product icon 910. The related product icon 950 may include a product similar to the product corresponding to the selected product icon 910, a matching product, a product of the same brand, and the like.

The controller 170 may display the related product icon 950 representing the similar product together with the selected product icon 910. In this case, there is an advantage in that a similar product can be introduced to the user in case the product according to the selected product icon 910 is out of stock.

When a plurality of related product icons 950 are displayed, the controller 170 may display the plurality of related product icons 950 in the order of price, sales volume, popularity, or the like.

In addition, each of the plurality of related product icons 950 may include a product name and product price information.

The detailed information icon 920 may be an icon that provides detailed information about the product corresponding to the selected product icon 910. The detailed information icon 920 may include a web icon 921 and a mobile icon 923.

The web icon 921 may be an icon that provides detailed information about the product corresponding to the selected product icon 910 through an Internet search function of the display device 100.

The mobile icon 923 may be an icon that provides a smartphone with detailed information about the product corresponding to the selected product icon 910.

The shopping cart icon 930 may be an icon for adding the product corresponding to the selected product icon 910 to the shopping cart.

The share icon 940 may be an icon for sharing product information corresponding to the selected product icon 910 with other users.

Again, FIG. 6 is described.

The controller 170 may determine whether the select command for selecting the web icon 921 of the detailed information icon 920 has been received (S101).

When the select command for selecting the web icon 921 is received, the controller 170 may display a website related to the product (S103).

Figure 11:
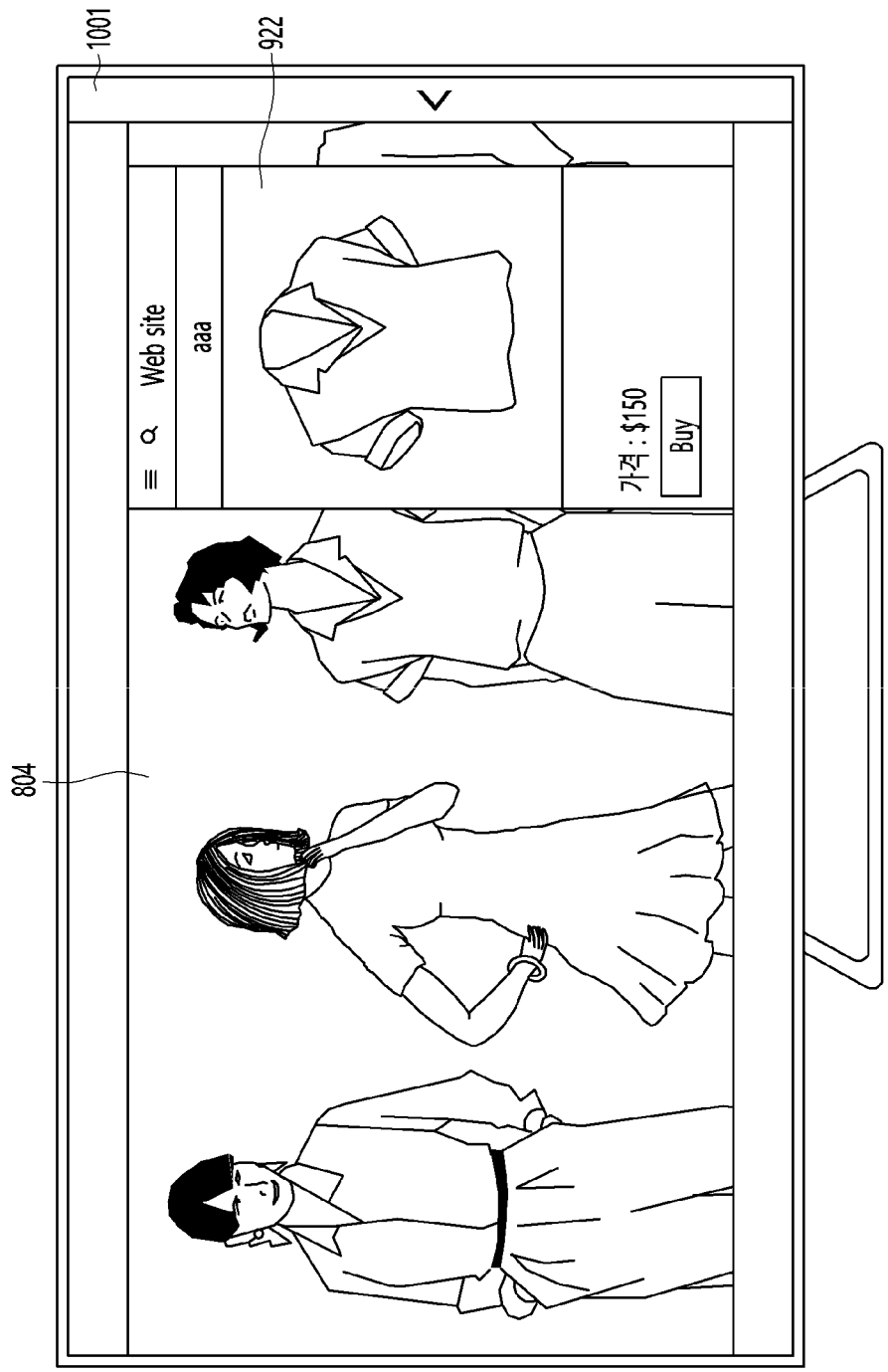
FIG. 11 is an exemplary view illustrating a method for providing detailed product information in the display device, according to an embodiment of the present disclosure.

FIG. 11 is an exemplary view illustrating a method for providing detailed product information in the display device, according to an embodiment of the present disclosure.

The controller 170 may display a website 922 when receiving a select command for selecting a web icon 921. The website 922 may be a website through which the product corresponding to the selected product icon 910 can be purchased.

When the select command for selecting the web icon 921 is received, the controller 170 may display the website 922 by accessing a URL to an address of a website where the product corresponding to the selected product icon 910 can be purchased.

Again, FIG. 6 is described.

When the select command for selecting the web icon 921 is not received, the controller 170 may determine whether the select command for selecting the mobile icon 923 of the detailed information icon 920 has been received (S105).

When the select command for selecting the mobile icon 923 is received, the controller 170 may transmit the address of the website related to the product to the mobile device (S107).

FIGS. 12 to 15 are exemplary views illustrating a method for providing detailed product information to a mobile device, according to an embodiment of the present disclosure.

Figure 12:
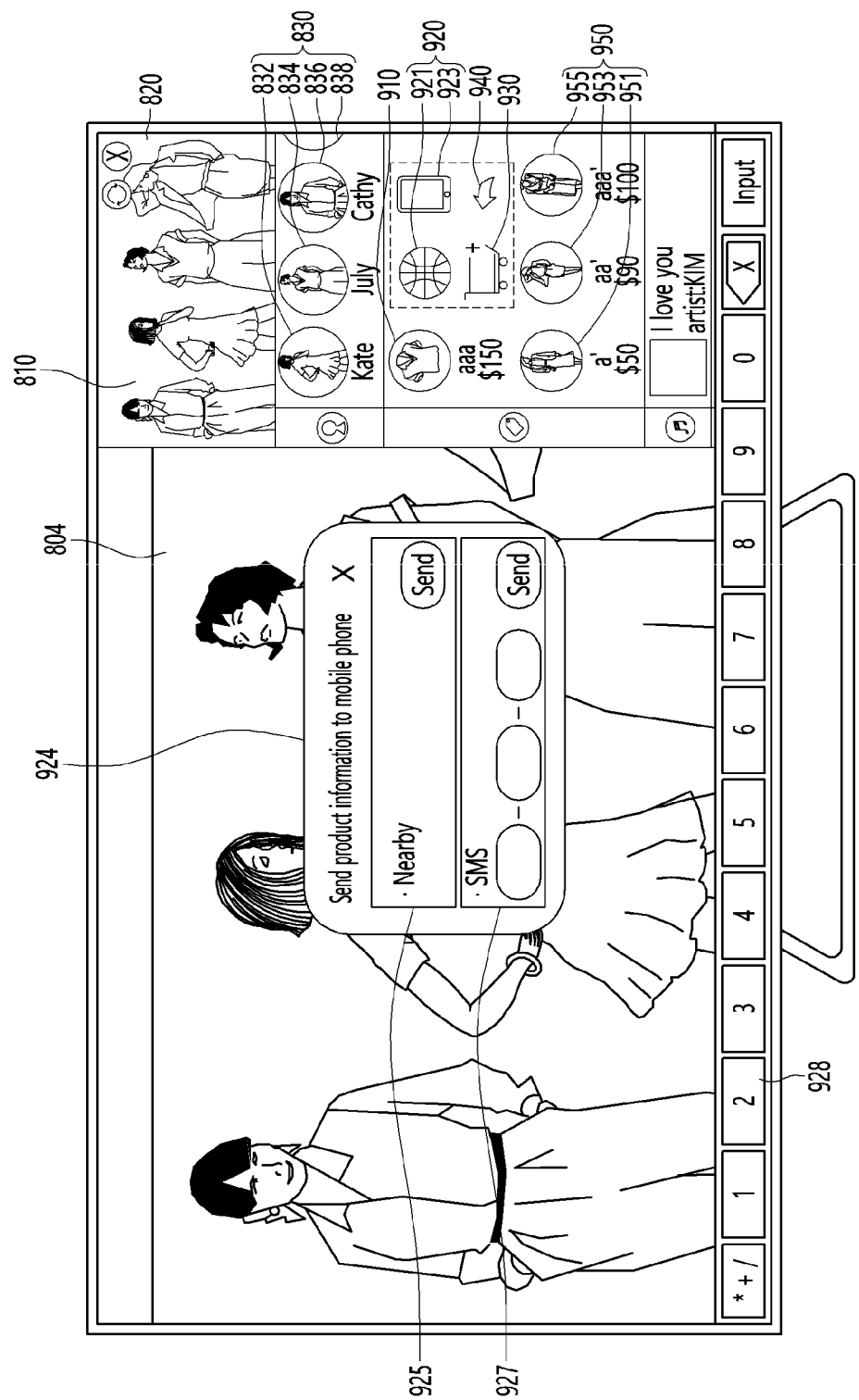
FIGS. 12 to 15 are exemplary views illustrating a method for providing detailed product information to a mobile device, according to an embodiment of the present disclosure.

As shown in FIG. 12, the controller 170 may display a transmission method selection icon 924 when receiving the command for selecting the mobile icon 923.

The transmission method selection icon 924 may include a wireless transmission icon 925 and a number transmission icon 927.

The wireless transmission icon 925 may be an icon for providing a website address to a mobile device by using Bluetooth Low Energy (BLE).

When the wireless transmission icon 925 is selected, the controller 170 may transmit the website address to at least one mobile device (see 1 of FIG. 13) existing within a set distance.

Figure 13:
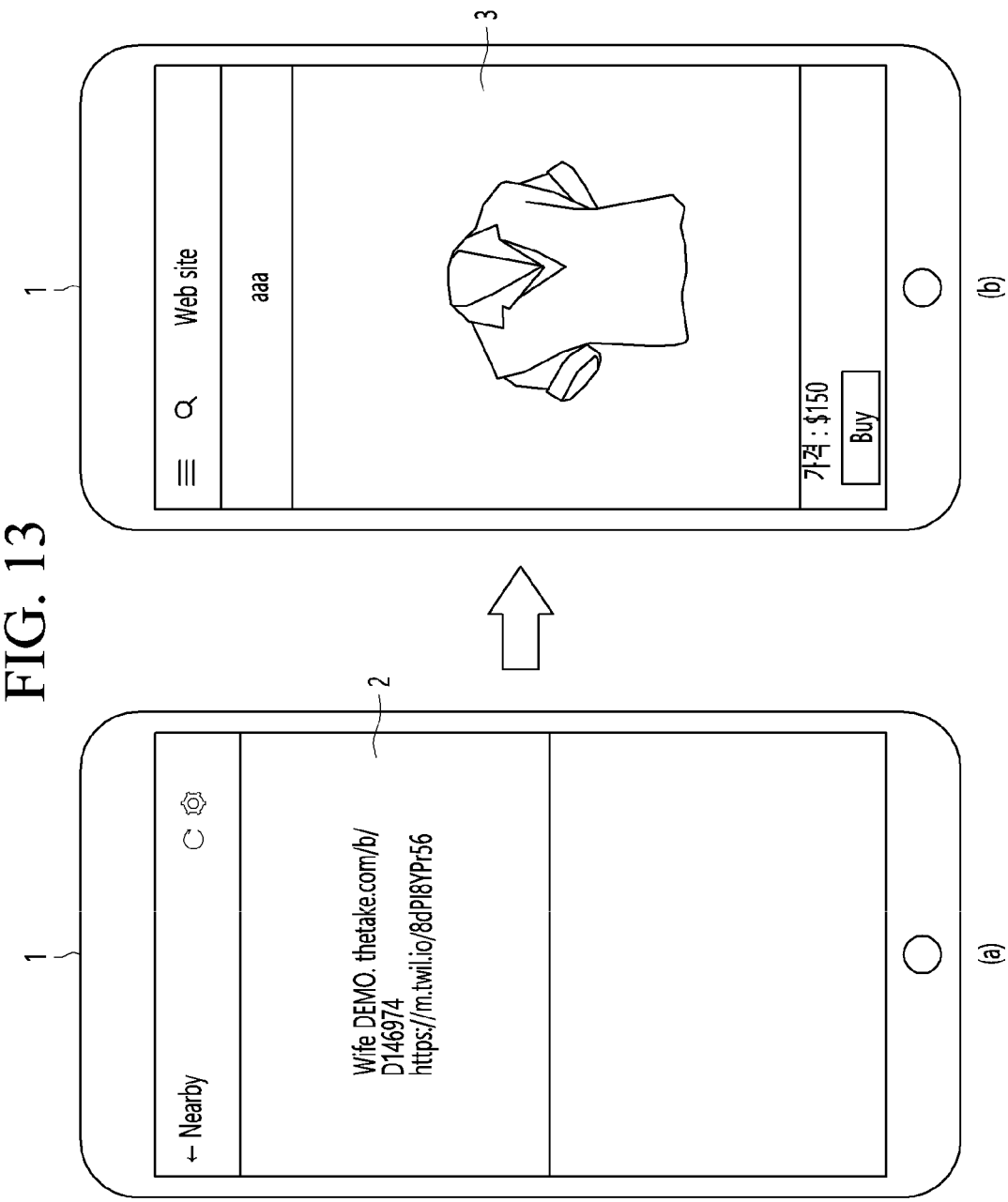

The mobile device 1 may be a smartphone, and when the mobile device 1 receives the website address from the display device 100, the mobile device 1 may display the received website address 2 as shown in FIG. 13(*a*). When the select command for selecting the website address 2 is received, the mobile device 1 may display the website 3 where the product corresponding to the selected product icon 910 can be purchased, as shown in FIG. 13(*b*).

On the other hand, the mobile device 1 may receive the website address from the display device 100 only when a Bluetooth function is on.

Figure 14:
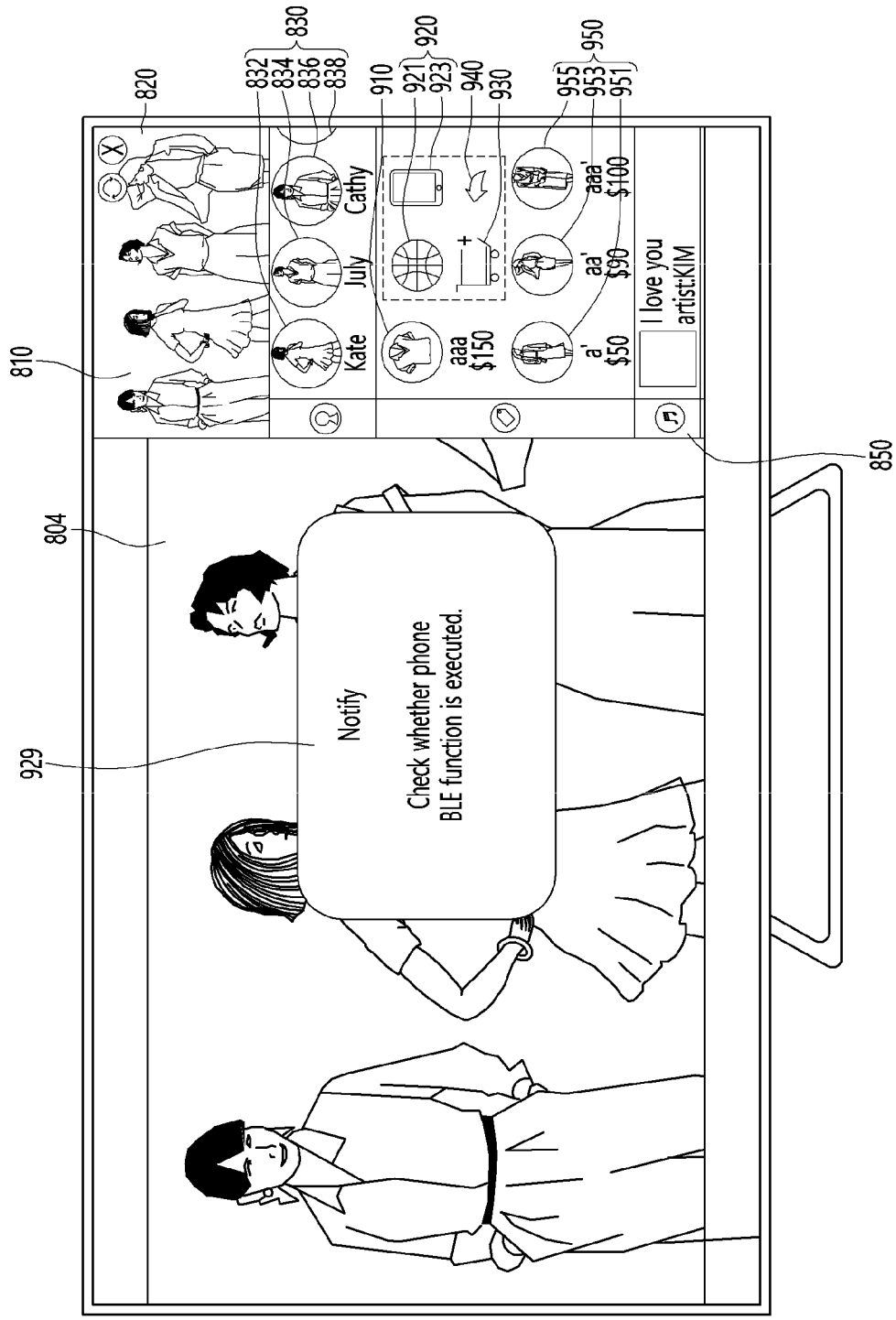

When the mobile device 1 in which the Bluetooth function is on does not exist within the set distance, the display device 100 may display a Bluetooth confirmation message 929 as shown in FIG. 14. The Bluetooth confirmation message 929 may include a guide message to confirm whether the BLE function of the mobile device is running. In this case, there is an advantage in that it is possible to guide the user why the website address is not received by mobile device and how to solve the problem.

The number transmission icon 927 may be an icon for providing the website address to the mobile device through a mobile communication technology.

The controller 170 may receive a mobile phone number inputted in the number transmission icon 927 through the number icon 928 displayed on the display 180 or the number key provided in the remote control device 200, and may transmit an external server (not shown) address request signal to transmit the website address to the inputted mobile phone number.

Figure 15:
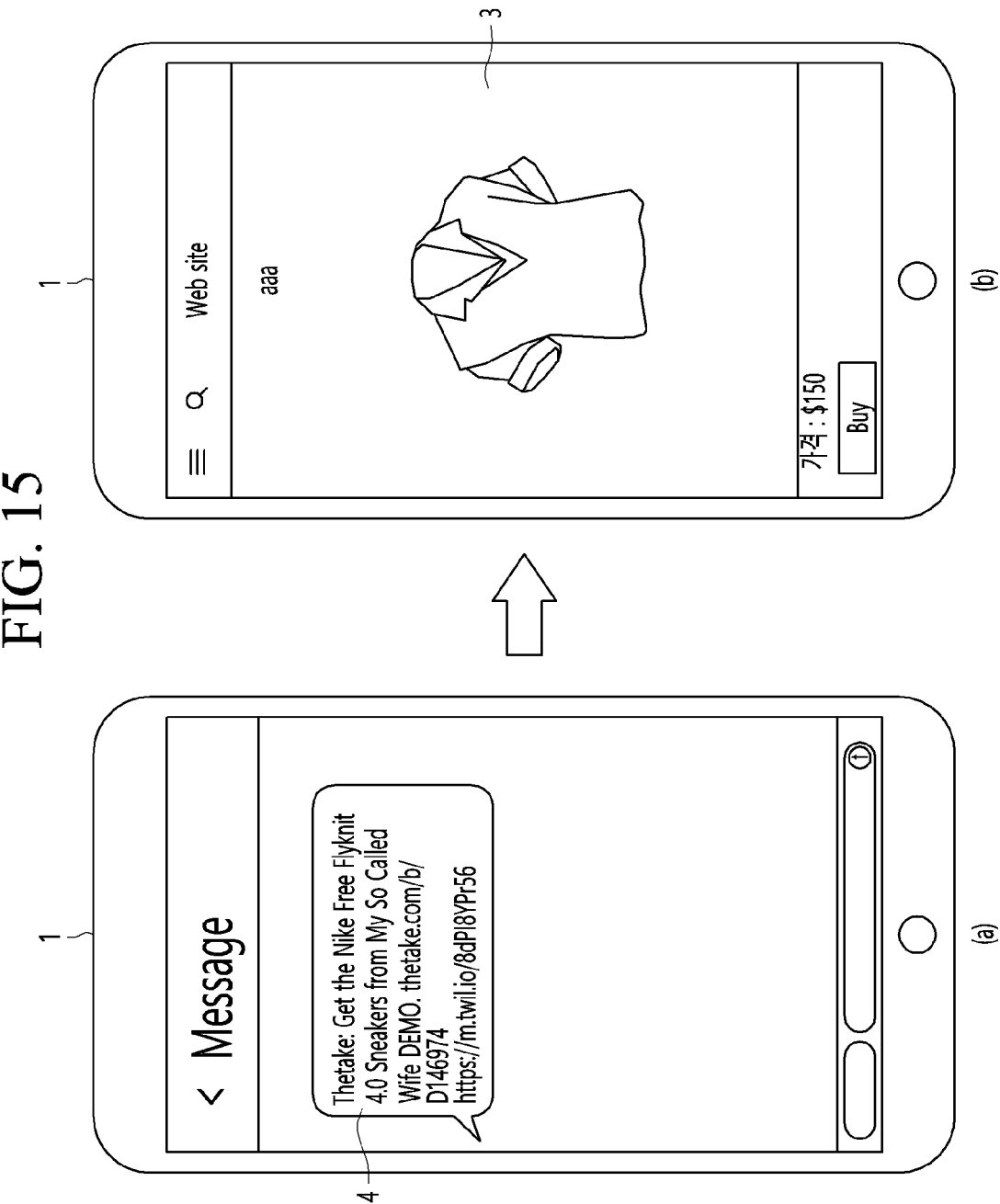

The mobile device 1 may receive a text message including the website address from the external server (not shown). In this case, the mobile device 1 may display the received website address 2 as shown in FIG. 15(*a*). When the select command for selecting the website address 2 is received, the mobile device 1 may display the website 3 where the product corresponding to the selected product icon 910 can be purchased, as shown in FIG. 15(*b*).

As described above, according to an embodiment of the present disclosure, the controller 170 may directly display, on the display 180, the website address for purchasing the product corresponding to the selected product icon 910 or may transmit the website address to the mobile device. When the controller 170 transmits the website address to the mobile device, there is an advantage that the user can easily purchase the product through the mobile device while watching the video.

Again, FIG. 6 is described.

The controller 170 may determine whether the select command for selecting the share icon 940 has been received (S109).

When the select command for selecting the share icon 940 is received, the controller 170 may transmit the address of the web site related to the product to another user (S111).

When the select command for selecting the share icon 940 is received, the controller 170 may transmit the address of the web site related to the product to another user through a method for interworking with other applications or the like.

On the other hand, when the controller 170 does not receive the select command for selecting the share icon 940, the controller 170 may determine whether the select command for selecting the shopping cart icon 930 has been received (S113).

When the select command for selecting the shopping cart icon 930 is received, the controller 170 may change the shopping cart icon 930 to a shopping cart addition complete icon (see 931 of FIG. 16) (S16).

Therefore, there is an advantage in that it is possible to inform the user whether the product corresponding to the selected product icon 910 has been added to the shopping cart.

The controller 170 may determine whether the select command for selecting the shopping cart addition completion icon 931 has been received (S117).

On the other hand, the controller 170 may display a shopping cart screen (see 932 of FIG. 17), which will be described later, according to whether a select command for selecting a shopping cart confirmation icon (not shown) is received, in addition to the shopping cart addition completion icon 931. That is, a display command for displaying a shopping cart screen may include a select command for selecting the shopping cart addition completion icon 931 or a select command for selecting the shopping cart confirmation icon (not shown). However, this is also only an example, and thus the present disclosure is not limited thereto.

When the select command for selecting the shopping cart addition completion icon 931 is received, the controller 170 may display a shopping cart screen (see 932 of FIG. 17) including at least one video item (S119).

The controller 170 may determine whether a select command for selecting any one video item in the shopping cart screen 932 has been received (S121).

The controller 170 may return to A of FIG. 5 when the select command for selecting the shopping cart icon 930 is not received in operation S113, when the select command for selecting the shopping cart addition completion icon 931 is not received in operation S117, or when the select command for selecting the video item is not received in operation S121.

When the select command for selecting any one video item in the shopping cart screen 932 is received, the controller 170 may display the product item added to the shopping cart related to the selected video item (S123).

Next, an operation method related to the shopping cart icon according to an embodiment of the present disclosure will be described with reference to FIGS. 16 to 18.

Figure 16:
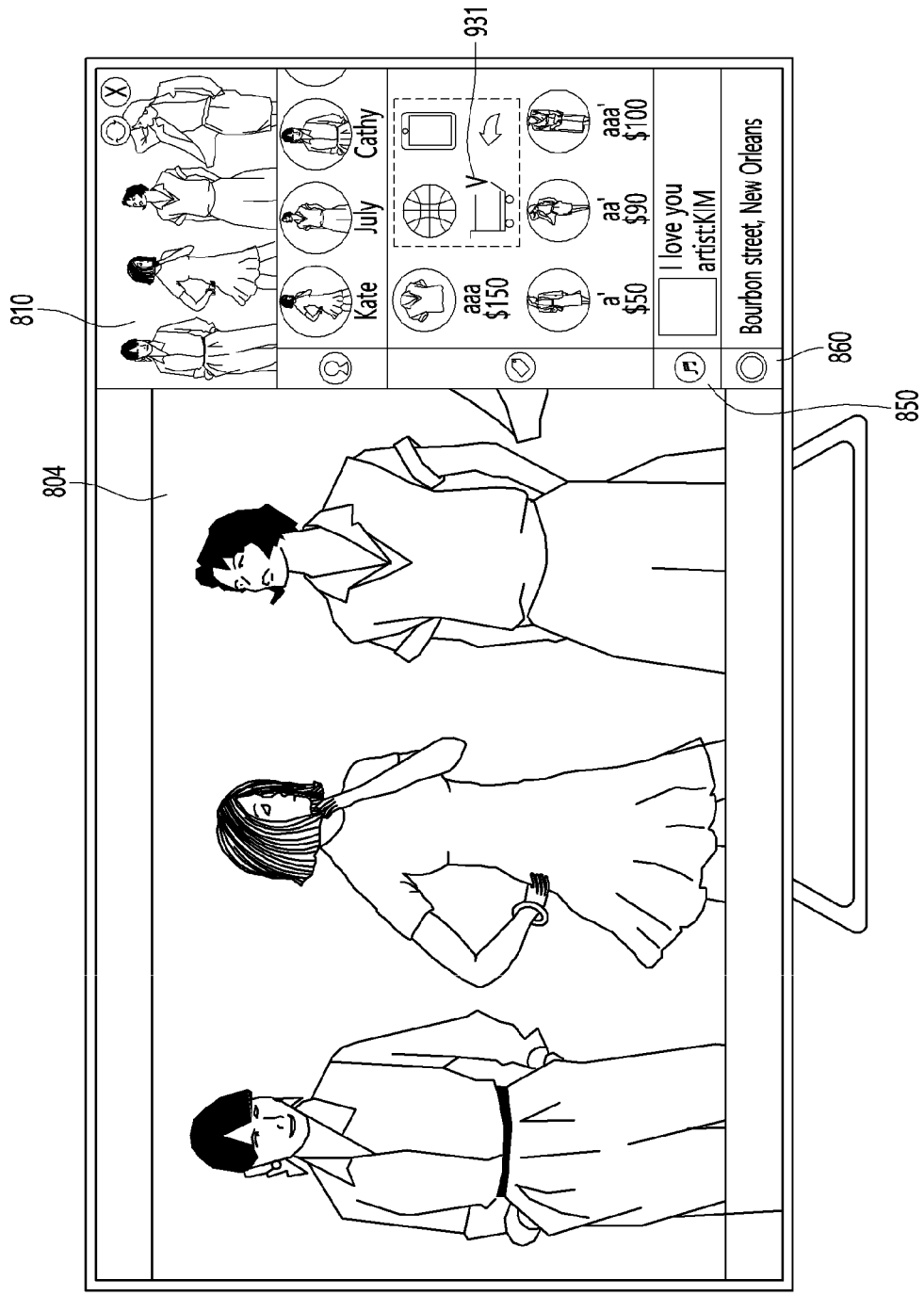
FIG. 16 is an exemplary view illustrating the shopping cart addition complete icon according to an embodiment of the present disclosure.
Figure 17:
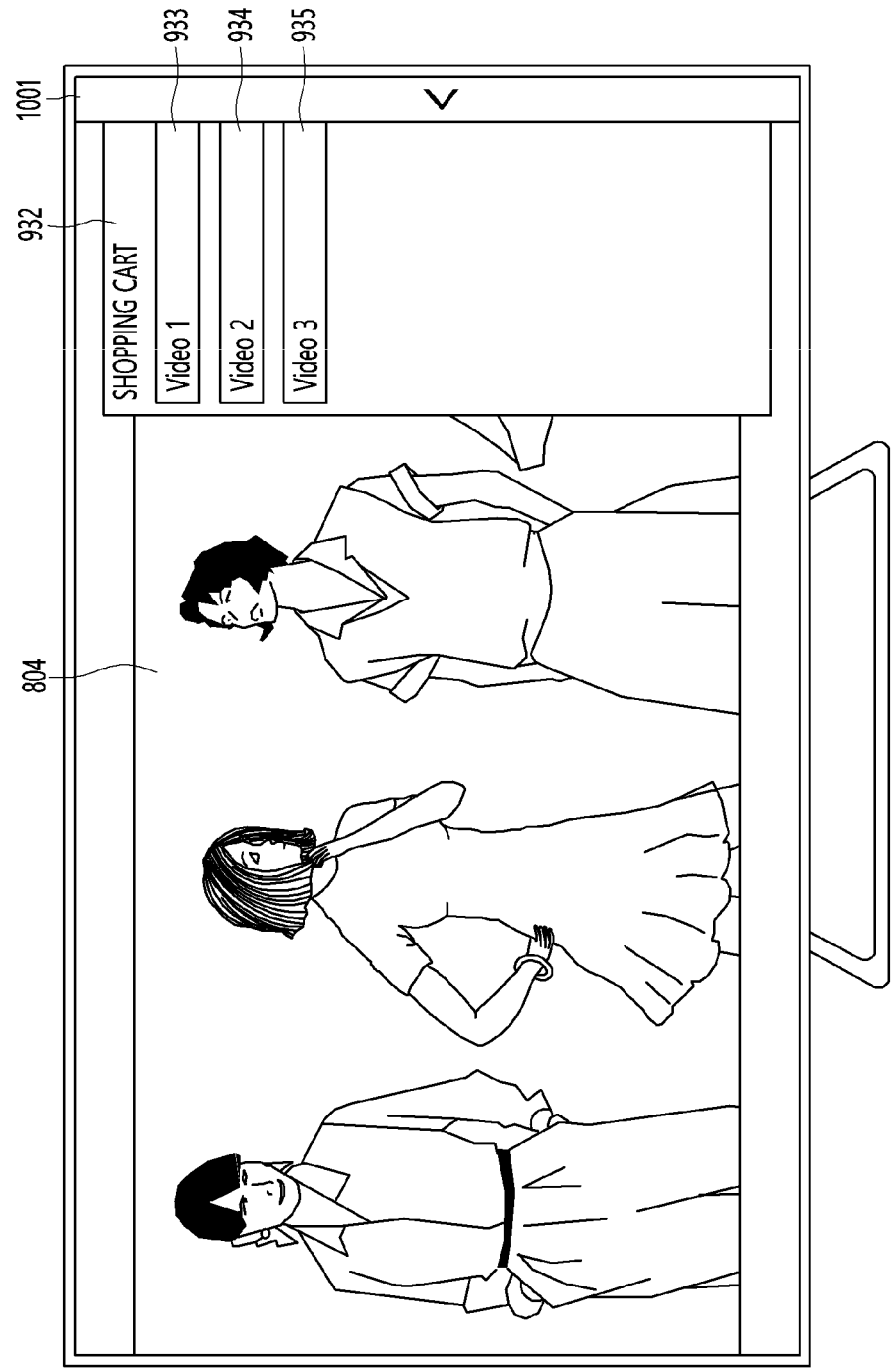
FIG. 17 is an exemplary view illustrating the shopping cart screen according to an embodiment of the present disclosure.
Figure 18:
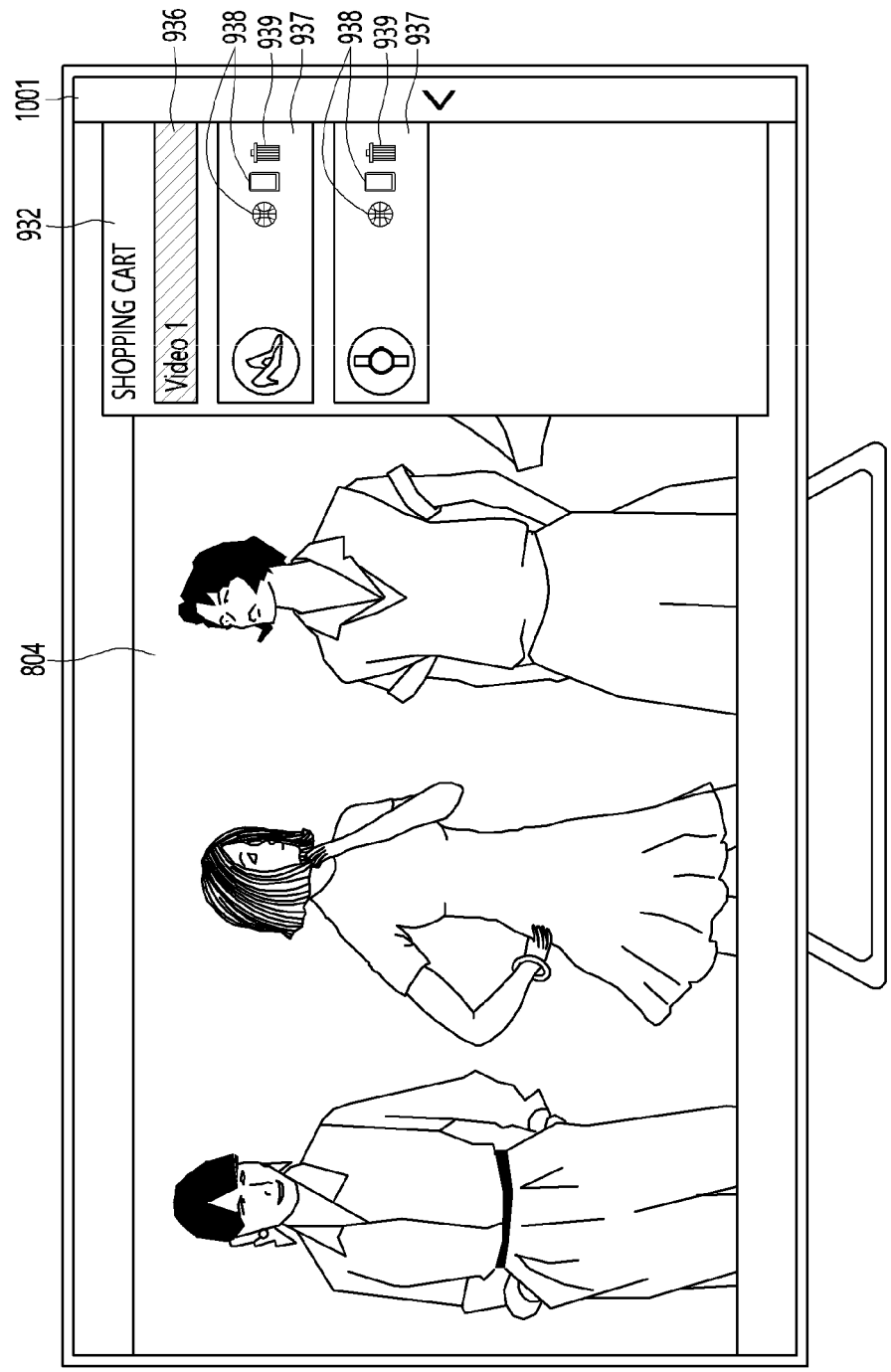
FIG. 18 is an exemplary view illustrating a method for displaying the product item added to the shopping cart according to an embodiment of the present disclosure.

FIG. 16 is an exemplary view illustrating the shopping cart addition complete icon according to an embodiment of the present disclosure, FIG. 17 is an exemplary view illustrating the shopping cart screen according to an embodiment of the present disclosure, and FIG. 18 is an exemplary view illustrating a method for displaying the product item added to the shopping cart according to an embodiment of the present disclosure.

When the select command for selecting the shopping cart icon 930 is received, the controller 170 may add the product corresponding to the selected product icon 910 to the shopping cart, and when the shopping cart addition is completed, the controller 170 may display the shopping cart addition completion icon 931 instead of the shopping cart icon 930.

The controller 170 may receive a select command for selecting the shopping cart addition completion icon 931. When the select command for selecting the shopping cart addition completion icon 931 is received, the controller 170 may display the shopping cart screen 932.

As shown in FIG. 17, the shopping cart screen 932 may include at least one video item 933, 934, and 935. The controller 170 may display video items 933, 934, and 935 indicating video in which at least one product added to the shopping cart is included among the products included in the video.

The controller 170 may receive a command for selecting any one of the video items 933, 934, and 935. In this case, a product item 937 representing the product that has been added to the shopping cart may be displayed on the video according to the selected video item.

For example, when the select command for selecting the video item 933 representing first video is received, the controller 170 may display the product item 937 representing the product that has been added to the shopping cart when the first video is reproduced in the past. When the select command for selecting the video item 934 representing second video is received, the controller may display the product item 937 representing the product that has been added to the shopping cart when the second video is reproduced in the past. When the select command for selecting the video item 935 representing third video is received, the controller 170 may display the product item 937 representing the product that has been added to the shopping cart when the third video is reproduced in the past.

Therefore, when the shopping cart screen is displayed, the controller 170 may display the products added to the shopping cart for each video. That is, the controller 170 may arrange and display the products, which are added when the corresponding video is reproduced, for each video. In this case, there is an advantage in that the user can easily obtain the products added to the shopping cart for each video.

On the other hand, the product item 937 may include a detailed information icon 938 and a trash can icon 939. The detailed information icon 938 may be the same as the detailed information icon 920 of FIG. 10. Since a detailed description is the same as that described with reference to FIG. 10, the detailed description is omitted. The trash can icon 939 may be an icon for deleting the product item 937.

Again, FIG. 5 is described.

When the select command for selecting the product icon 841 is not received, the controller 170 may determine whether the select command for selecting the music recognition icon 851 has been received (S41). When the select command for selecting the music recognition icon 851, the controller 170 may receive the sound signal (S43) and display music information according to the sound signal (S45).

Next, the music recognition icon according to an embodiment of the present disclosure will be described with reference to FIG. 19.

Figure 19:
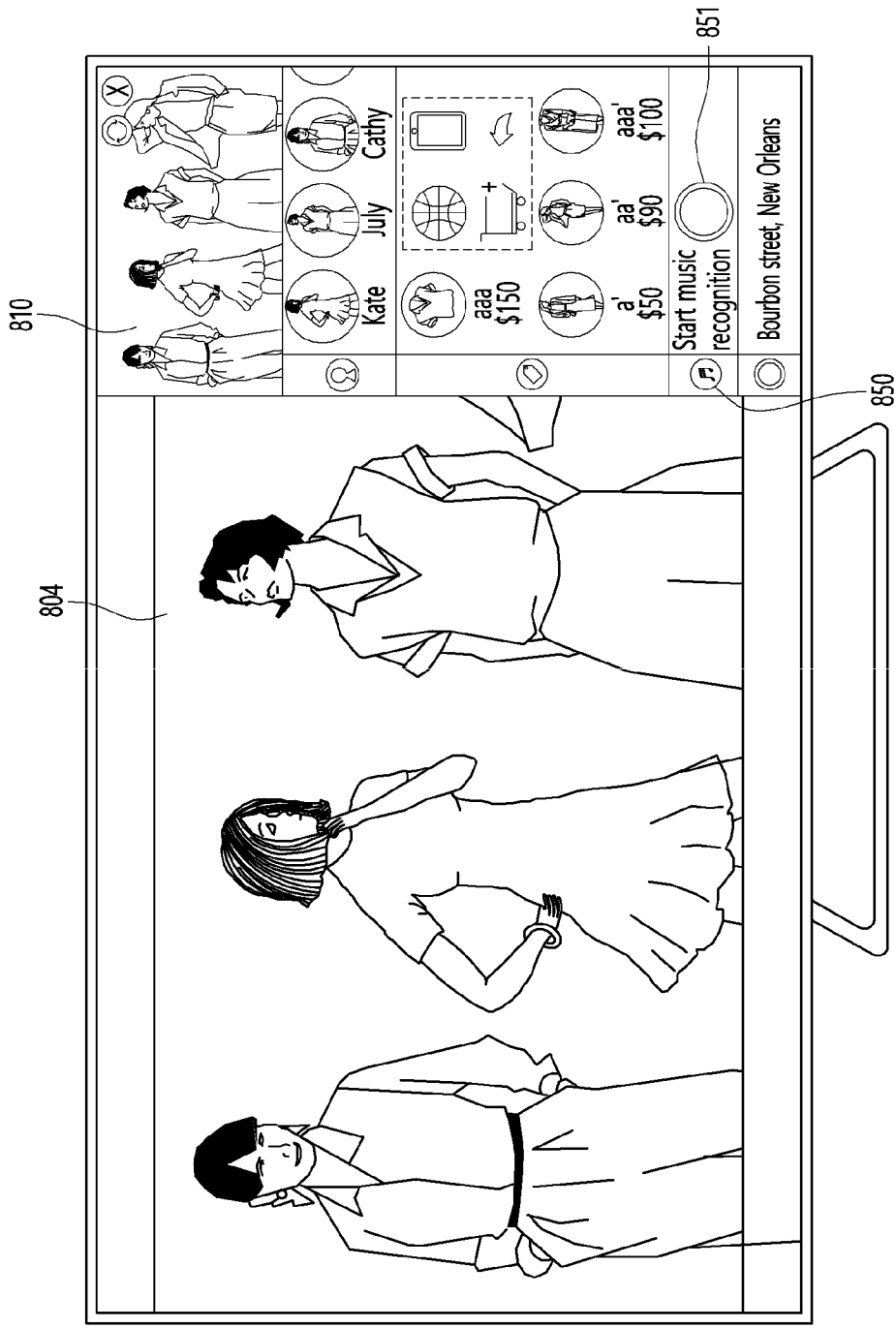
FIG. 19 is an exemplary view illustrating the music recognition icon according to an embodiment of the present disclosure.

FIG. 19 is an exemplary view illustrating the music recognition icon according to an embodiment of the present disclosure.

When the search result screen 802 is displayed, the controller 170 may directly display information about the sound as shown in FIG. 8.

On the other hand, when the search result screen 802 is displayed, the controller 170 may display the music recognition icon 851 on the music information 850. In this case, the information about the sound may not be stored as scene metadata, but the present disclosure is not limited thereto.

When the select command for selecting the music recognition icon 851 is received, the controller 170 may transmit a sound recognition control command so that the microphone 291 provided in the remote control device 200 recognizes the sound output from the video.

The controller 170 may receive a sound signal from the remote control device 200, and may obtain and display music information such as an album name, an album cover image, a track name, an artist name, and the like corresponding to the received sound signal.

On the other hand, when the select command for selecting the music recognition icon 851 is not received, the controller 170 may determine whether the select command for selecting the place information 860 has been received (S51), and when the select command for selecting the place information 860 is received, the controller 170 may display at least one of a map, an address, a trade name, or a site related to the place in the video scene (S53).

Next, a method for displaying detailed place information when the select command for selecting the place information 860 is received, according to an embodiment of the present disclosure will be described with reference to FIG. 20.

Figure 20:
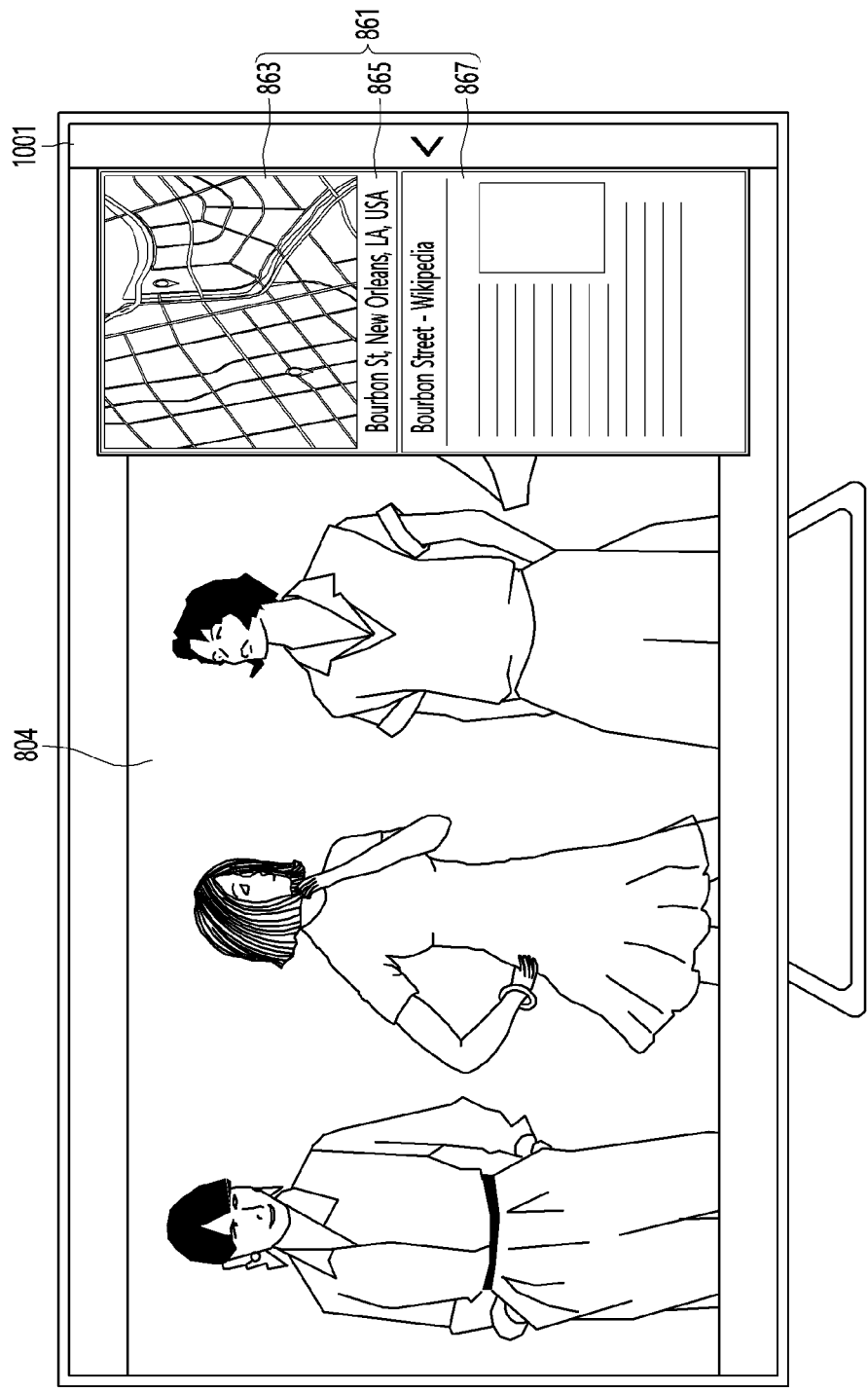
FIG. 20 is an exemplary view illustrating a method for displaying detailed place information according to an embodiment of the present disclosure.

FIG. 20 is an exemplary view illustrating a method for displaying detailed place information according to an embodiment of the present disclosure.

The controller 170 may receive a select command for selecting place information 860, and when the select command for selecting the place information 860 is received, the controller 170 may display detailed place information 861 as shown in FIG. 20.

The detailed place information 861 may include at least one of map information 863, address information 865, or a site 867. In addition, the detailed place information 861 may further include a business name, a user review, and the like. The site 867 is a site for the corresponding place, and may include a user review site for the corresponding place.

Therefore, the controller 170 may briefly provide the place information 860 through the search result screen 802, and when the select command for selecting the place information 860 is received, the controller 170 may provide detailed information about the corresponding place.

On the other hand, referring to FIGS. 17, 18, and 20, the controller 170 may further display an expansion bar 1001 when displaying the shopping cart screen 932 or the detailed place information 861. The expansion bar 1001 may be an icon for displaying the search information area 810. When a select command for selecting the expansion bar 1001 is received, the controller 170 may display the search information area 810 instead of the shopping cart screen 932 or the detailed place information 861.

Therefore, the controller 170 can provide the user with detailed information about products and places added to the shopping cart without interfering with the user's video viewing.

According to an embodiment of the present disclosure, the above-described methods may be implemented as processor-readable code in a medium on which a program is recorded. Examples of the processor-readable medium include ROM, RAM, CD-ROM, magnetic tape, floppy disk, optical data storage, and the like.

The display devices described above are not limited to the configuration and method of the above-described embodiments, and the embodiments may be configured by selectively combining all or part of the embodiments so that various modifications can be made thereto.

The invention claimed is:

1. A display device comprising:
a display configured to display a first video in a first window;
a controller configured to:
receive a search command for searching information about a product included in the displayed first video,
obtain video scene information of the displayed first video at a time point when the search command is received,
obtain information about a first product included in the video scene information,
display a search result screen on the display including a first product icon representing the first product included in the video scene information,
receive a select command to add a first video item corresponding to the first product to a cart,
display a cart addition completion icon indicating the first video item has been added to the cart in response to the select command,
in response to a selection of the cart addition completion icon, display the first video item in a first sub-window of the first window and display the first video in a second sub-window of the first window; and
in response to a selection of the first video item, display a first product item depicting the first product and a second product item depicting a second product in the first sub-window of the first window.

2. The display device of claim 1, wherein the controller is configured to further receive information about a person included in the video scene information and display a product icon for each person.

3. The display device of claim 2, wherein the controller is configured to
display a person icon representing each person appearing in the video scene information based on the information about the person, and
display the product icon related to a selected person when a select command for selecting the person icon is received.

4. The display device of claim 1, wherein the controller is configured to display a related product icon representing a product similar to the selected first product when a select command for selecting the first product icon is received.

5. The display device of claim 1, wherein the controller is configured to display a web icon for accessing a website for purchasing the first product when a select command for selecting the first product icon is received.

6. The display device of claim 1, wherein the controller is configured to
display a mobile icon for transmitting a website address for purchasing a selected product to a mobile device when a select command for selecting the first product icon is received, and
transmit the website address to the mobile device when a select command for selecting the mobile icon is received.

7. The display device of claim 6, wherein the controller is configured to transmit the website address to the mobile device located within a set distance from the display through Bluetooth low energy (BLE).

8. The display device of claim 6, wherein the controller is configured to
receive an input of a mobile phone number, and
transmit the website address to the inputted mobile phone number.

9. The display device of claim 1, wherein the controller is configured to further receive information about music included in the video scene information, and
display information about the music on the search result screen.

10. The display device of claim 1, wherein the controller is configured to
display a music recognition icon on the search result screen, and
when a select command for selecting the music recognition icon, recognize a sound through a microphone provided in a remote control device and display music information.

11. The display device of claim 1, wherein the controller is configured to
  receive information about a place included in the video scene information, and
  display information about the place on the search result screen.

12. The display device of claim 11, wherein the information about the place includes at least one of map information, address information, a business name, or a site for the place included in the video scene information.

13. The display device of claim 9, wherein the search result screen includes a video area including the video and a search information area including the product icon.

* * * * *